(12) United States Patent
Kamali et al.

(10) Patent No.: US 10,267,957 B2
(45) Date of Patent: Apr. 23, 2019

(54) CONFORMAL OPTICAL METASURFACES

(71) Applicant: CALIFORNIA INSTITUTE OF TECHNOLOGY, Pasadena, CA (US)

(72) Inventors: Seyedeh Mahsa Kamali, Pasadena, CA (US); Ehsan Arbabi, Pasadena, CA (US); Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/975,521

(22) Filed: May 9, 2018

(65) Prior Publication Data

US 2018/0275321 A1    Sep. 27, 2018

Related U.S. Application Data

(62) Division of application No. 15/097,101, filed on Apr. 12, 2016, now Pat. No. 9,995,859.

(60) Provisional application No. 62/151,531, filed on Apr. 23, 2015.

(51) Int. Cl.
| | | |
|---|---|---|
| G02B 5/02 | (2006.01) | |
| G02B 1/00 | (2006.01) | |
| G02B 5/18 | (2006.01) | |
| G02B 27/00 | (2006.01) | |
| G02B 27/42 | (2006.01) | |

(52) U.S. Cl.
CPC .......... *G02B 5/0226* (2013.01); *G02B 1/002* (2013.01); *G02B 5/0242* (2013.01); *G02B 5/0263* (2013.01); *G02B 5/0268* (2013.01); *G02B 5/0278* (2013.01); *G02B 5/1876* (2013.01); *G02B 27/0025* (2013.01); *G02B 27/4211* (2013.01)

(58) Field of Classification Search
CPC .... G02B 5/0226; G02B 5/021; G02B 5/0205; G02B 5/0263; G02B 5/0268; G02B 5/1876; G02B 1/002; G02B 27/0025; G02B 27/4211
USPC ........................................................ 359/642
See application file for complete search history.

(56) References Cited

U.S. PATENT DOCUMENTS

| | | | |
|---|---|---|---|
| 8,994,059 B2* | 3/2015 | Huh ................... | H01L 51/5275 257/98 |
| 9,995,930 B2* | 6/2018 | Arbabi .............. | G02B 27/0031 |
| 2003/0169504 A1* | 9/2003 | Kaminsky ........... | G02B 5/0221 359/622 |
| 2007/0019306 A1 | 1/2007 | Wu et al. | |
| 2008/0161194 A1 | 7/2008 | Turner et al. | |
| 2009/0250110 A1 | 10/2009 | Yu et al. | |

(Continued)

OTHER PUBLICATIONS

P.R. West et al. "All-dielectric subwavelength metasurface focusing lens", Oct. 17, 2014 | vol. 22, No. 21 | DOI:10.1364/OE.22.026212 | Optics Express 26212.*

(Continued)

*Primary Examiner* — William R Alexander
(74) *Attorney, Agent, or Firm* — Steinfl + Bruno, LLP

(57) ABSTRACT

Structures for scattering light at multiple wavelengths are disclosed. Scattering elements are fabricated with different geometric dimensions and arrangements, to scatter or focus light at the same focal distance for each wavelength, or at different focal distances according to the desired application. The scattering elements fabricated on a substrate can be peeled off with a polymer matrix and attached to a lens to modify the optical properties of the lens.

7 Claims, 21 Drawing Sheets

(56) References Cited

U.S. PATENT DOCUMENTS

| | | | |
|---|---|---|---|
| 2011/0141541 A1* | 6/2011 | Bratkovski | G02B 1/005 359/240 |
| 2012/0082863 A1 | 4/2012 | Ohta et al. | |
| 2014/0146390 A1 | 5/2014 | Kaempfe et al. | |
| 2014/0167022 A1* | 6/2014 | Huh | H01L 51/5275 257/40 |
| 2014/0264998 A1* | 9/2014 | Smith | H01L 31/02366 264/104 |
| 2014/0277433 A1* | 9/2014 | Pugh | G02B 1/002 623/6.17 |
| 2016/0299337 A1* | 10/2016 | Arbabi | G02B 27/0031 |

OTHER PUBLICATIONS

F. Aieta et al., "Aberrations of flat lenses and aplanatic Metasurfaces", Dec. 13, 2013 | vol. 21, No. 25 | DOI:10.1364/OE.21.031530 | Optics Express 31530.*

I. Staude et al., "Tailoring Directional Scattering through Magnetic and Electric Resonances in Subwavelength Silicon Nanodisks", ACS Nano, 2013, 7 (9), pp. 7824-7832, DOI: 10.1021/nn402736f, Publication Date (Web): Aug. 16, 2013.*

Arababi et al., ("Subwavelength-thick lenses with high numerical apertures and large efficiency based on high-contrast transmitarrays", Nature Communications vol. 6, Article No. 7069 (2015)), DOI: 10.1038/ncomms8069 (Year: 2015).*

Restriction Requirement for U.S. Appl. No. 15/096,615, filed Apr. 12. 2016 on behalf of California Institute of Technology; dated May 30, 2018. 7 pages.

Non-Final Office Action for U.S. Appl. No. 15/096,615, filed Apr. 12, 2016 on behalf of California Institute of Technology; dated Oct. 29, 2018. 16 pages.

Final Office Action for U.S. Appl. No. 15/241,914, filed Aug. 19, 2016 on behalf of California Institute of Technology; dated May 1, 2018. 21 pages.

* cited by examiner

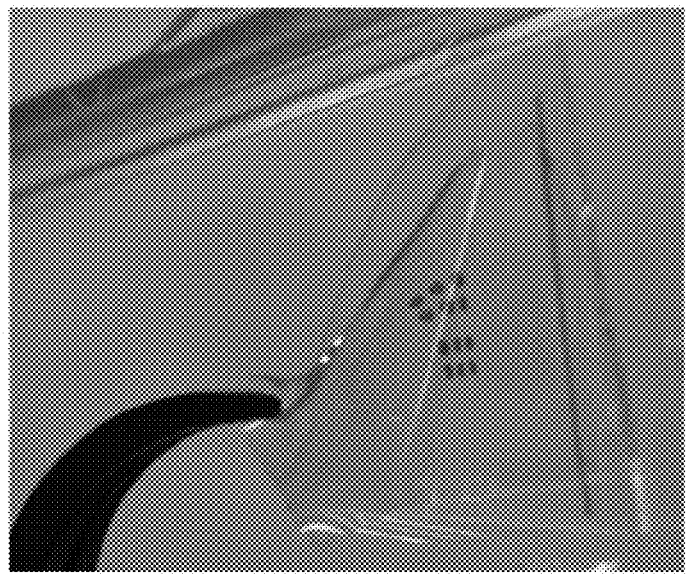
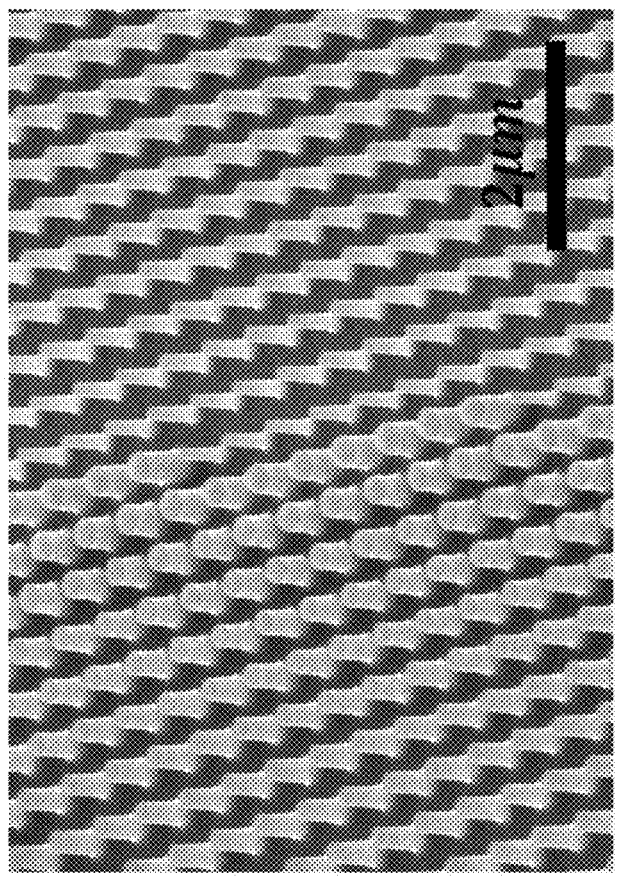
FIG. 2

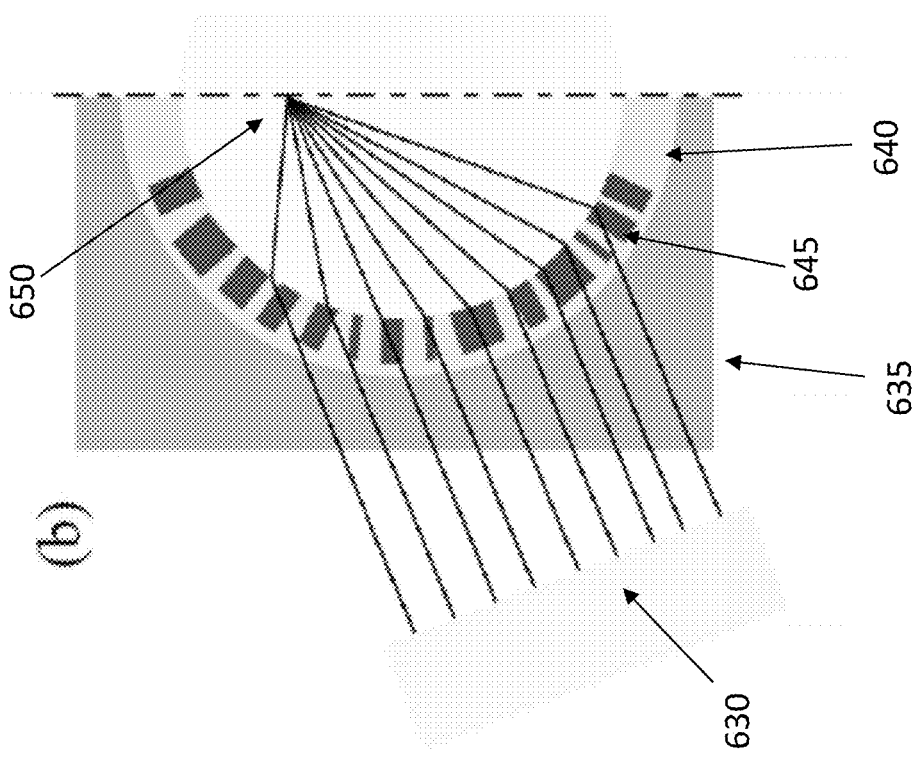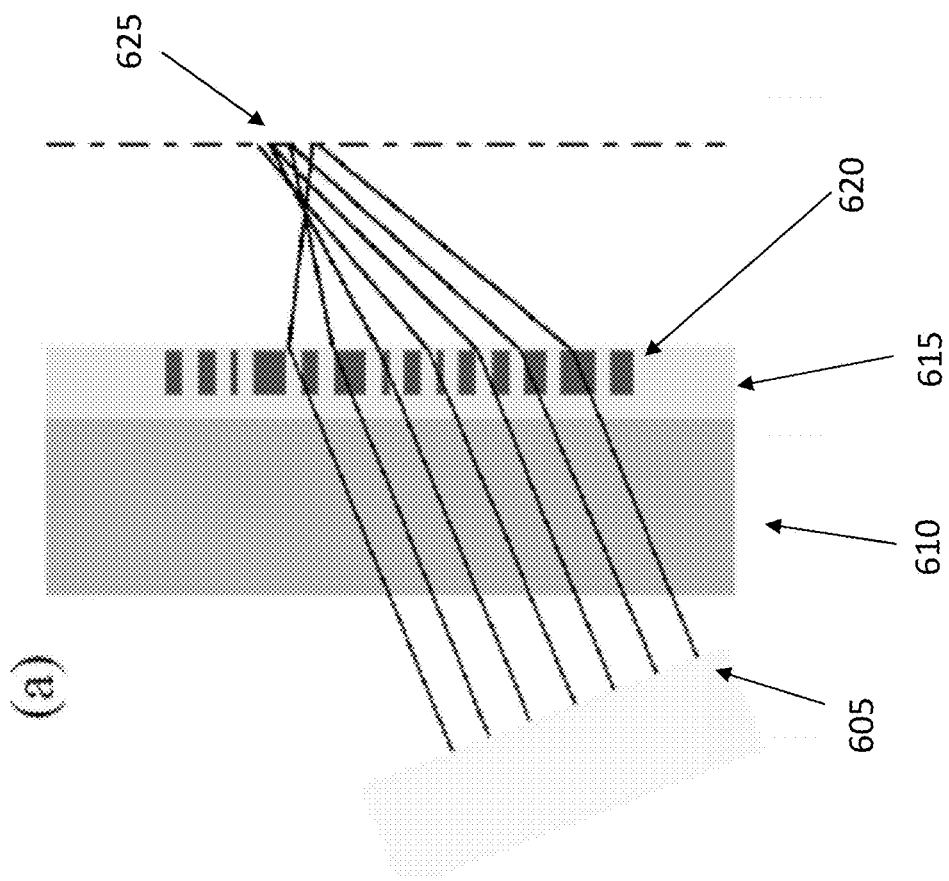
FIG. 6

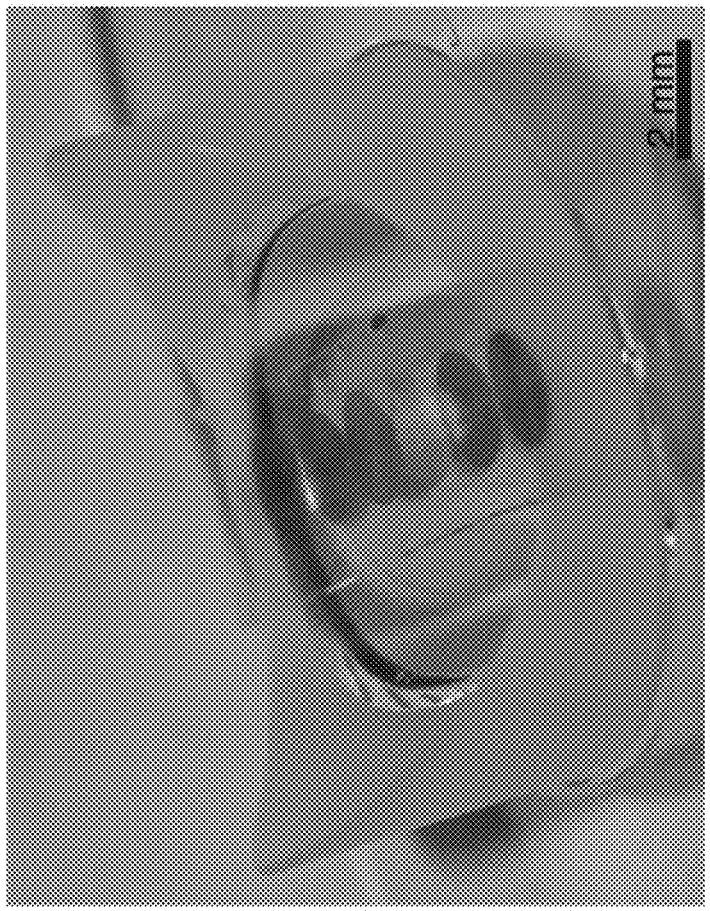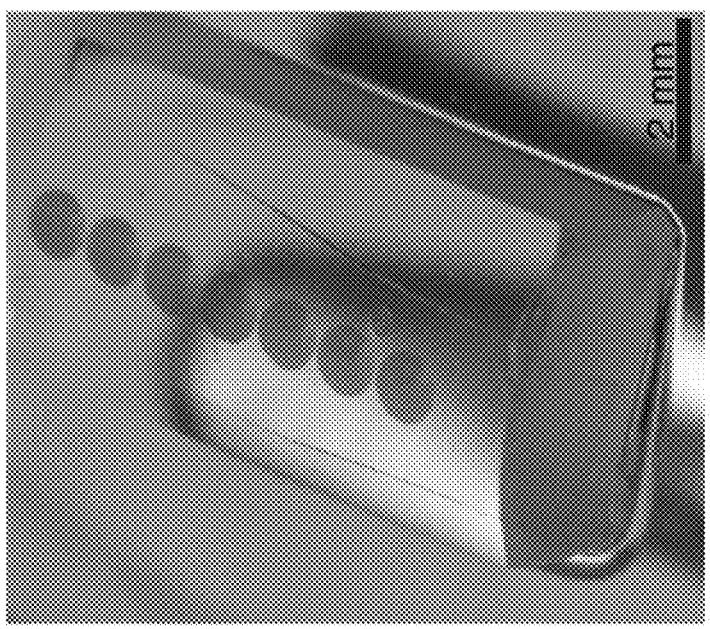
FIG. 11

CONFORMAL OPTICAL METASURFACES

CROSS REFERENCE TO RELATED APPLICATIONS

The present application is a divisional of U.S. patent application Ser. No. 15/097,101 filed on Apr. 12, 2016, which in turn, claims priority to U.S. Provisional Patent Application No. 62/151,531, filed on Apr. 23, 2015, and may be related to U.S. Provisional Patent Application No. 62/147,392, filed on Apr. 14, 2015, the disclosures of both of which are incorporated herein by reference in their entirety.

STATEMENT OF INTEREST

This invention was made with government support under Grant No. DE-SC0001293 awarded by the Department of Energy and under Grant No. W911NF-14-1-0345 awarded by the US Army. The government has certain rights in the invention.

TECHNICAL FIELD

The present disclosure relates to optical scattering. More particularly, it relates to conformal optical metasurfaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 2 illustrates fabricated microlenses.

FIG. 6 illustrates an exemplary metasurface for oblique beams.

Optical images of meta-surfaces conformed to the convex and concave glass cylinders are shown in FIG. 11.

Figure 12:
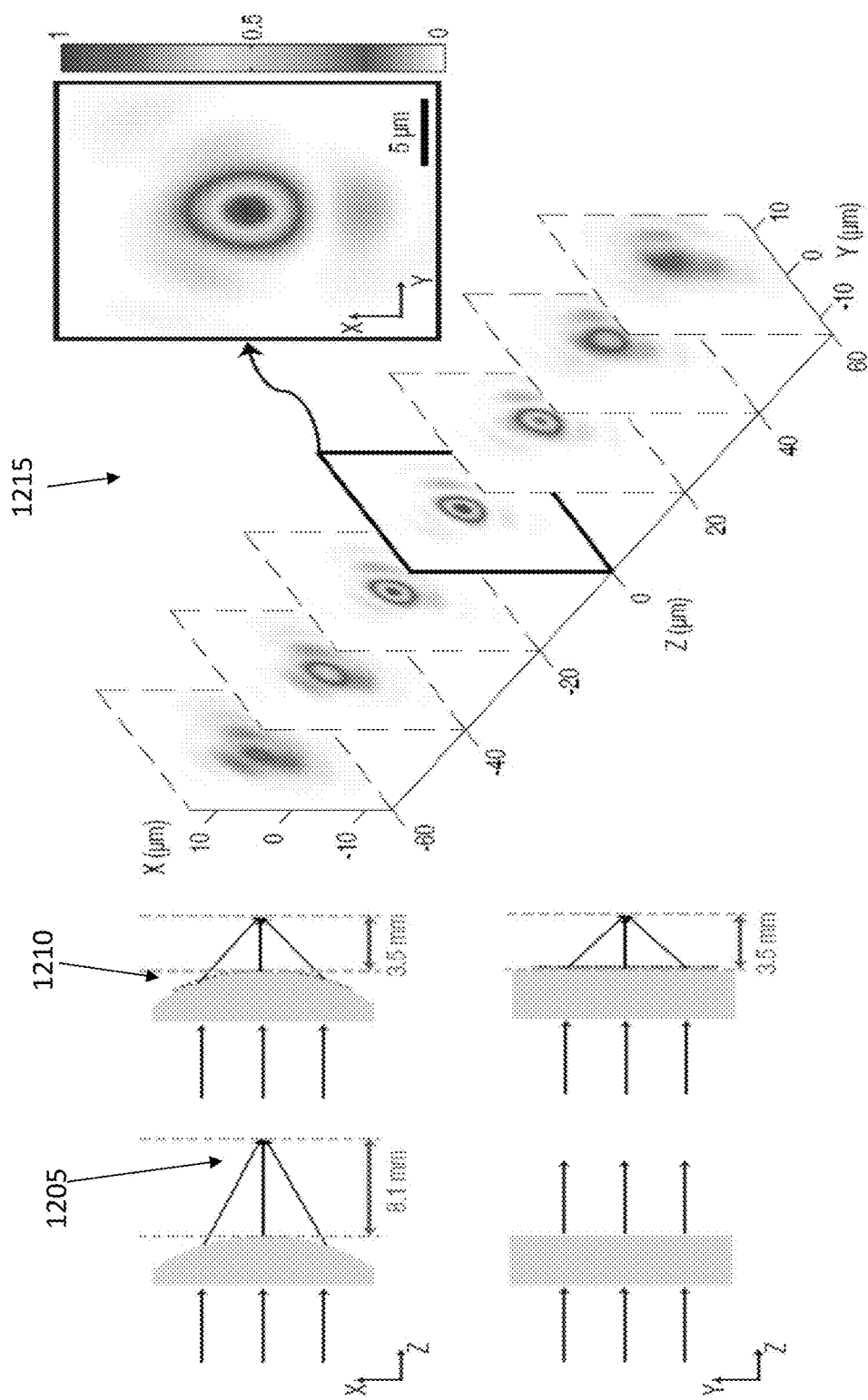
Figure 13:
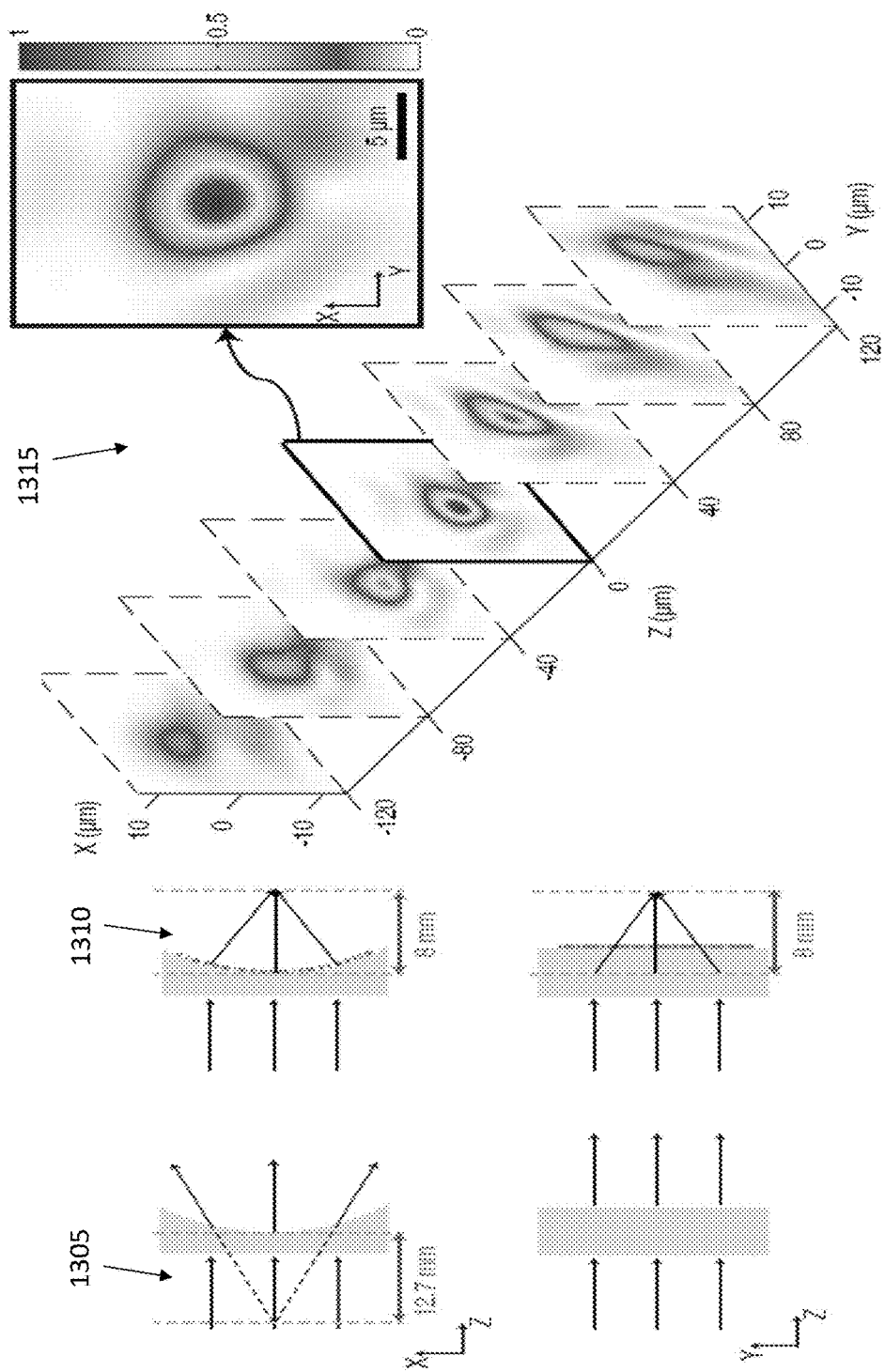

FIGS. 12 and 13 illustrate exemplary lenses with metasurfaces.

Figure 14:
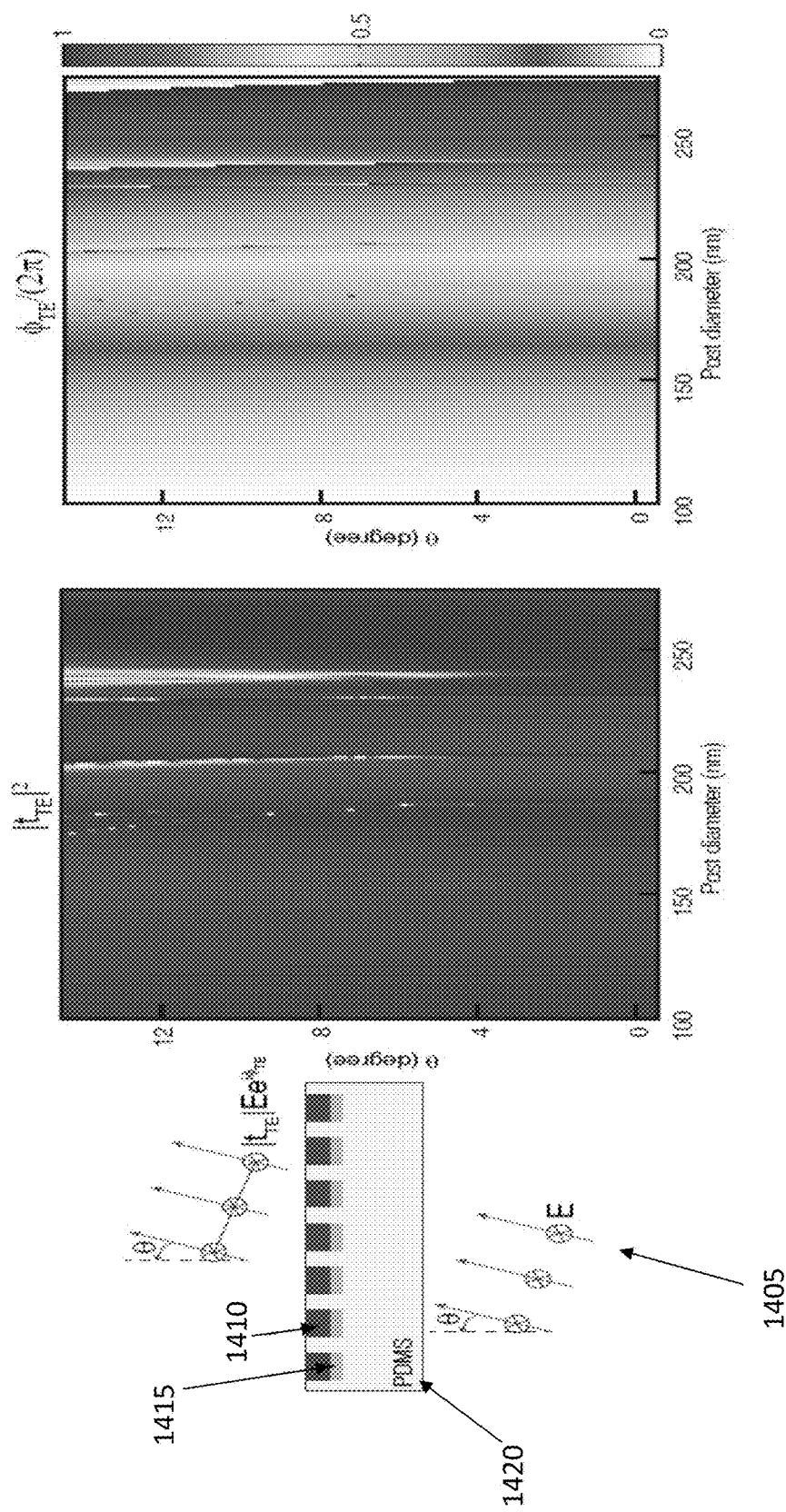
Figure 15:
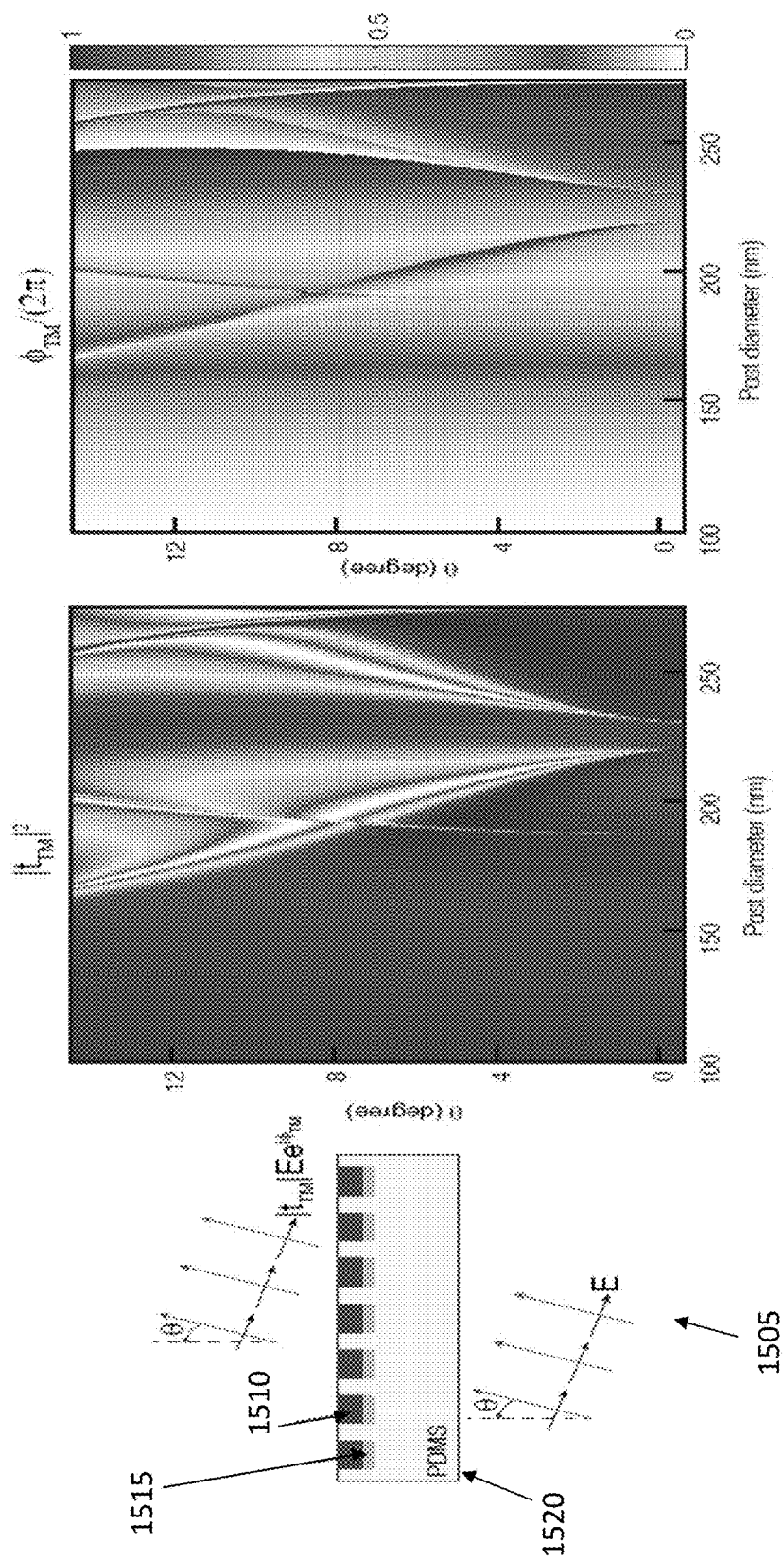

FIGS. 14 and 15 illustrate simulations results of metasurfaces.

Figure 16:
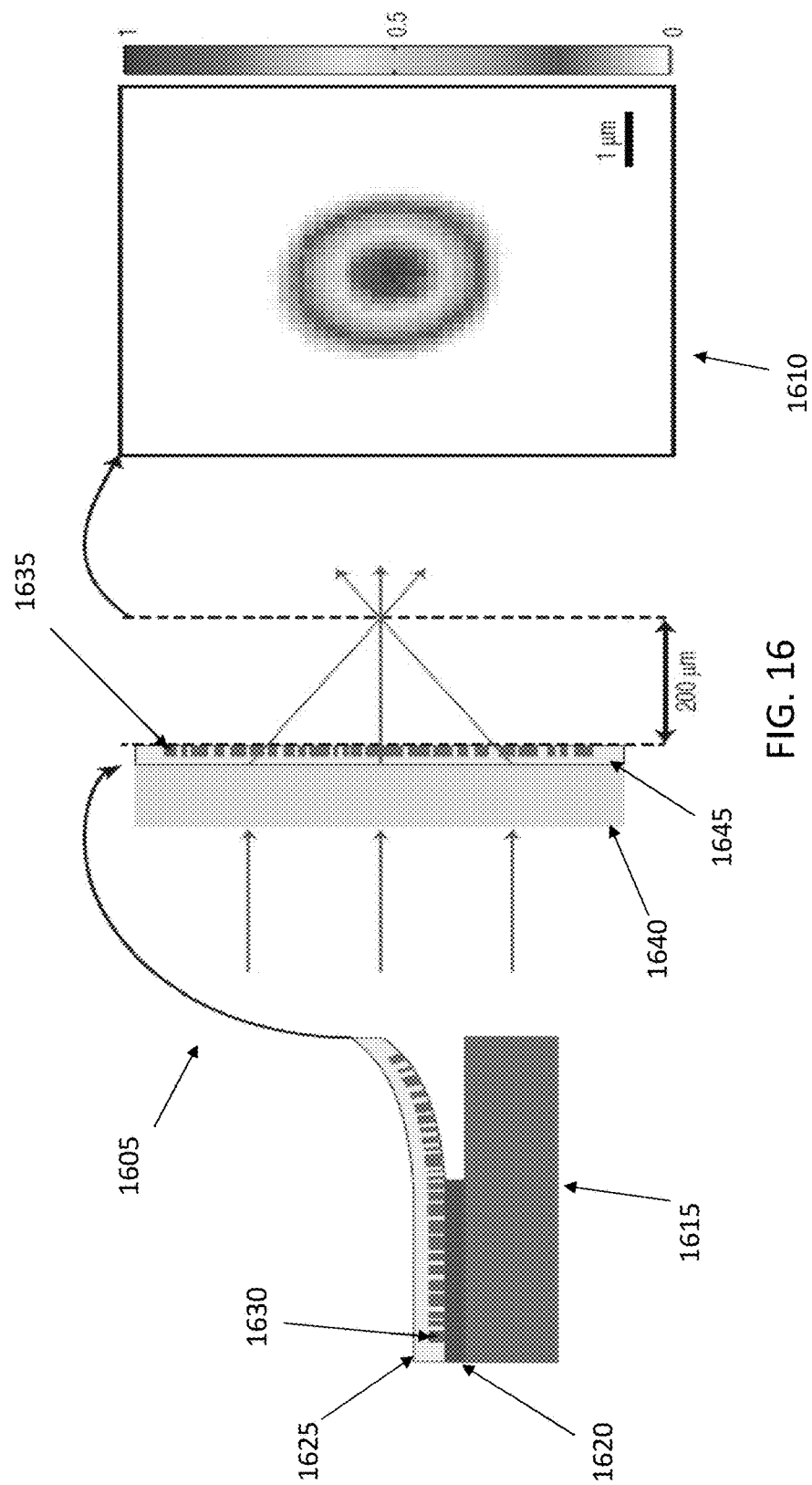

FIG. 16 shows a metasurface lens designed to operate as an aspherical lens when mounted on a flat substrate.

Figure 17:
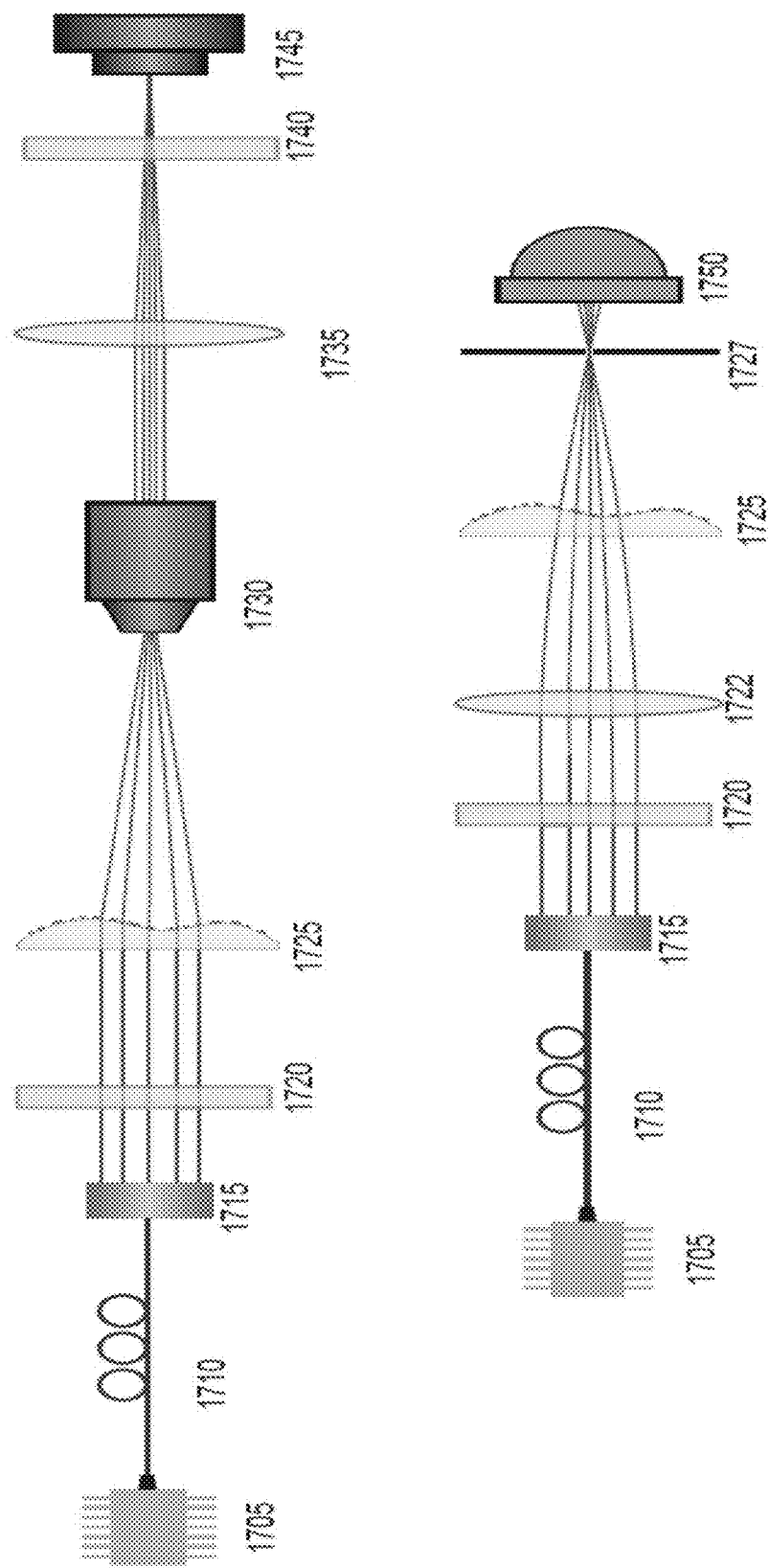

FIG. 17 shows a schematic illustration of the measurement setup.

Figure 18:
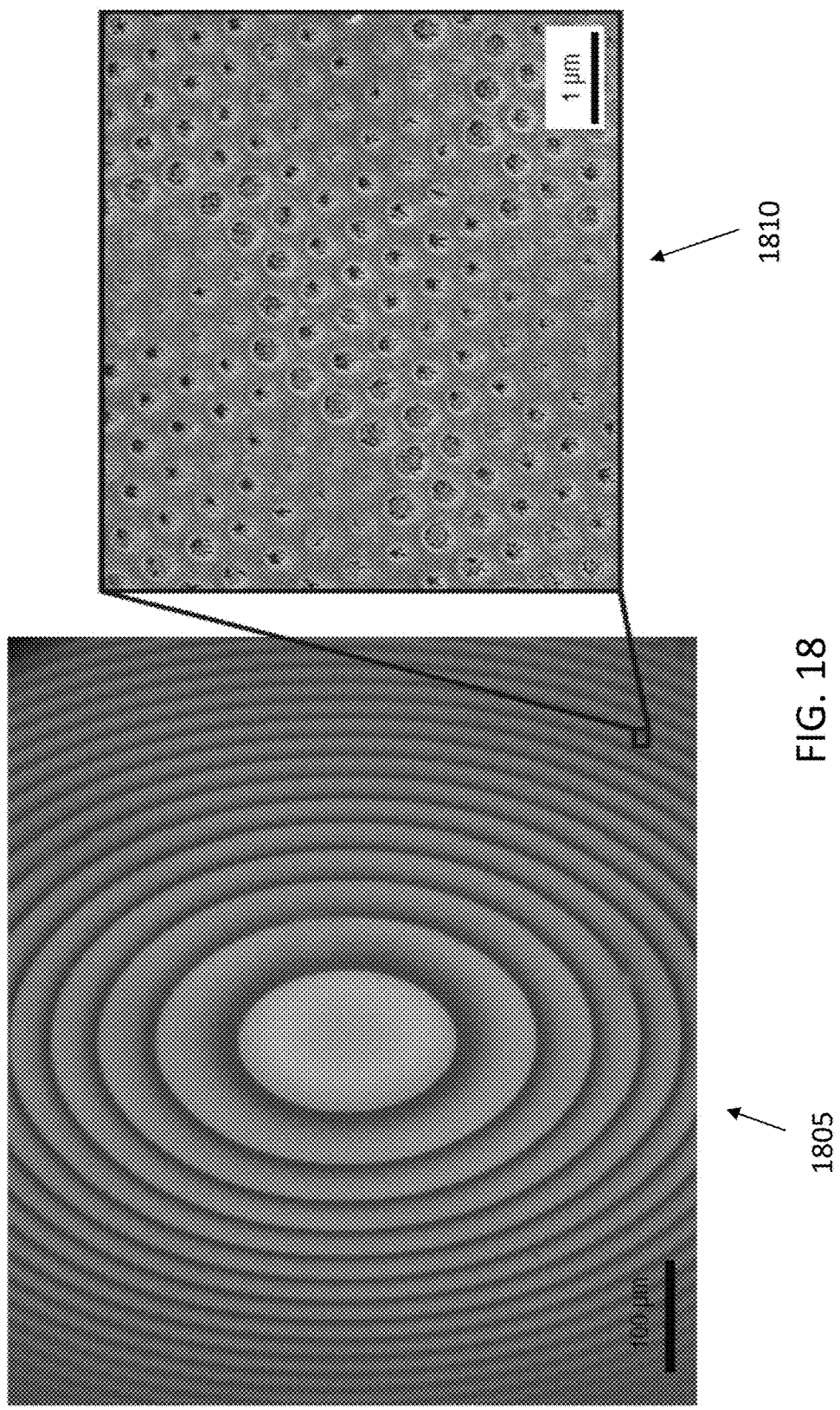

FIG. 18 illustrates an optical microscope image of a portion of a flexible metasurface.

Figure 19:
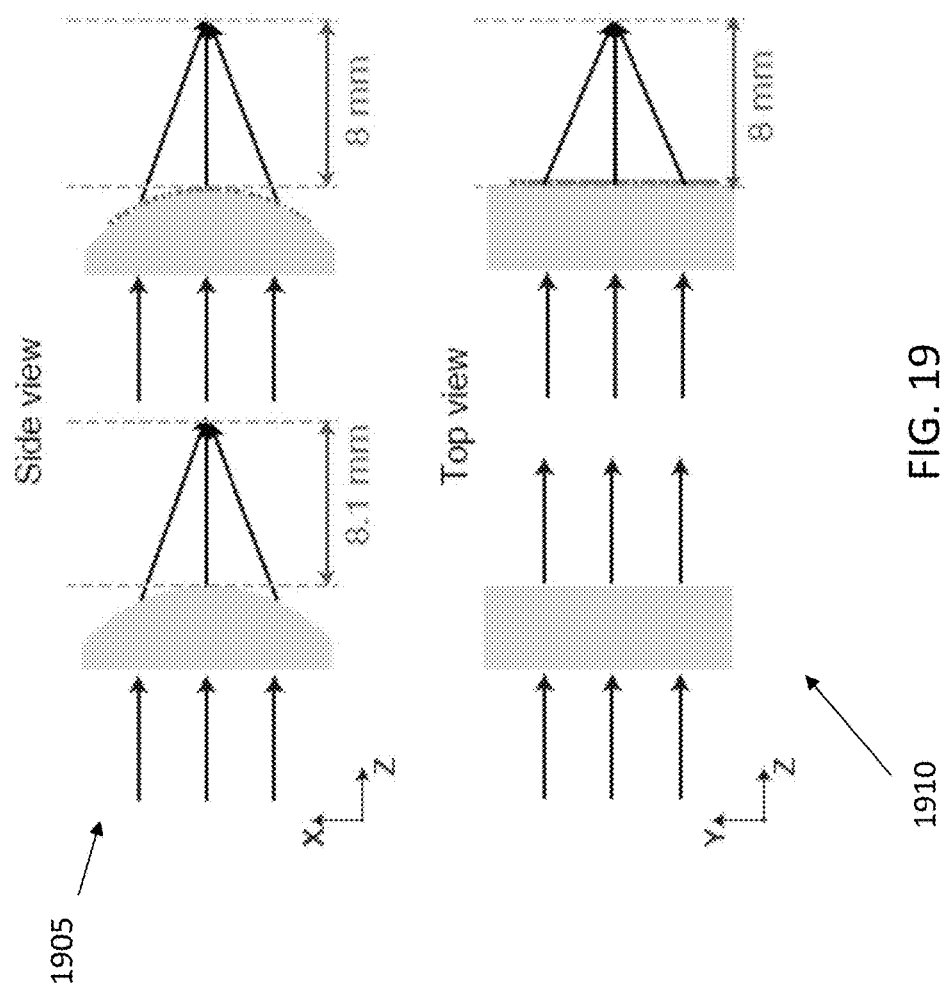

FIG. 19 shows schematic illustrations of the converging cylinder with and without the meta-surface layer.

Figure 20:
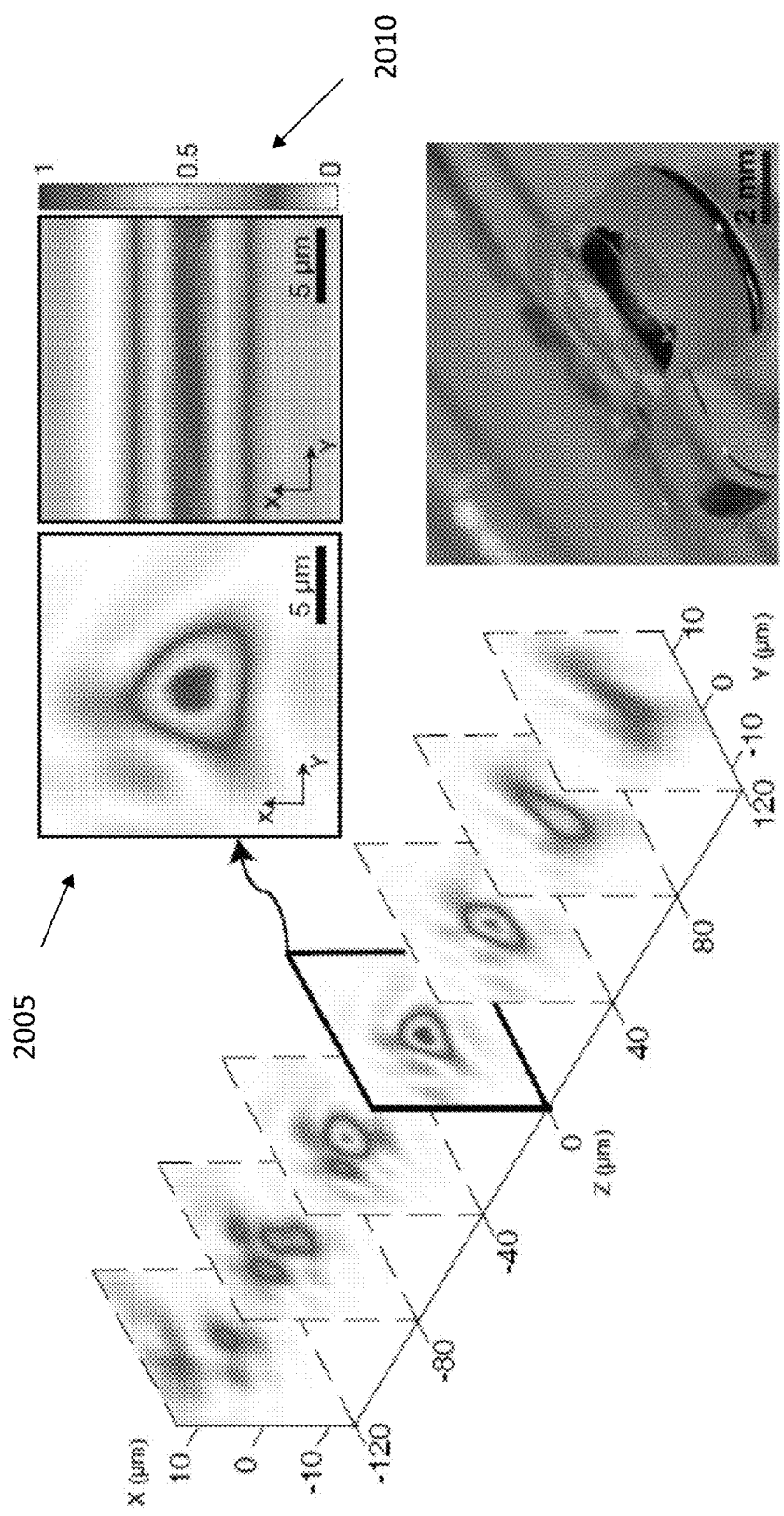

FIG. 20 shows the measured intensities at different planes parallel to the focal plane for the metasurface covered cylinder.

Figure 21:
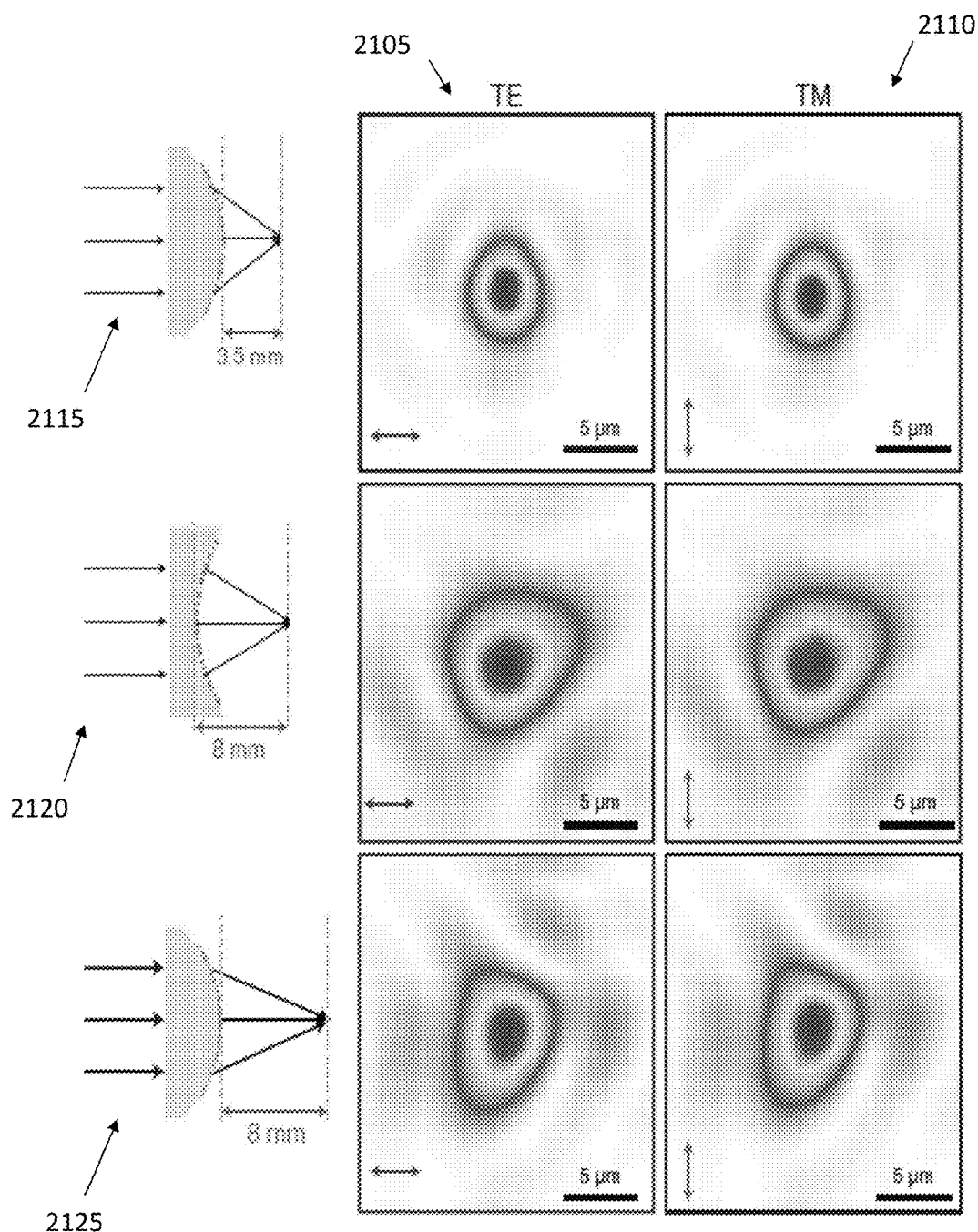

FIG. 21 illustrates the effect of input beam polarization on device performance.

SUMMARY

In a first aspect of the disclosure, a structure is described, the structure comprising: a lens having a curved surface; a plurality of scattering elements on the curved surface.

In a second aspect of the disclosure, a method is described, the method comprising: fabricating a metasurface on a substrate, the metasurface having a plurality of scattering elements; depositing a polymer matrix on the metasurface; peeling off the plurality of scattering elements from the substrate, by peeling off the polymer matrix from the substrate; attaching the plurality of scattering elements to a lens, by attaching the polymer matrix to the lens.

In a third aspect of the disclosure, a method is described, the method comprising: calculating a first phase profile of optical waves at a surface of a lens; calculating a second phase profile of optical waves at the surface of the lens according to a desired functionality of the lens, the second phase profile being a desired phase profile different from the first phase profile; calculating a third phase profile of optical waves equal to a difference between the first and second phase profiles; calculating physical dimensions of scattering elements at the surface of the lens necessary to obtain the third phase profile of optical waves; fabricating a metasurface of scattering elements according to the calculated physical dimensions; and attaching the metasurface to the surface of the lens, thereby obtaining a metasurface lens having the second phase profile of optical waves.

DETAILED DESCRIPTION

Optical metasurfaces comprise a large number of scatterers, controlling light over a sub-wavelength thickness through strong light-matter interactions. Metasurfaces are promising candidates for replacing conventional optical devices in some applications and enable new functionalities, see Refs. [1-5]. Conformal metasurfaces (i.e. metasurfaces that can be mounted on and conform to nonplanar structures) are of importance in applications with geometrical constraints. This structural degree of freedom can also be utilized in the design process to improve performance. The present disclosure describes a new platform of conformal optical metasurfaces.

Conformal optical metasurfaces are optically engineered layers that are wrapped in or conform to a surface, and modify the optical properties of the surface. These metasurfaces are thin optical structures composed of scatterers with dimensions of the order of the optical wavelength, or smaller than a wavelength at which the surfaces are designed to operate. The metasurfaces are dispensed on or embedded inside potentially flexible layers and are designed to modify the optical properties of potentially nonplanar surfaces. For example, the metasurfaces may be deposited on a curved rigid substrate, or they may be deposited on flexible substrates.

According to the present disclosure, almost any desirable optical functionality is achievable over a surface with an arbitrary shape, by transferring a flat metasurface onto a flexible, stretchable substrate. As a result, the now flexible metasurface can be conformed to an arbitrarily shaped surface. Metasurfaces can operate at different frequency regimes of the electromagnetic spectrum, including but not limited to the microwave and terahertz regimes, or the visible light spectrum. The present disclosure describes different types of lenses that are mounted on flat and cylindrical surfaces. The optical metasurface structure described herein is composed of a large number of discrete (physically unconnected) micron or submicron scale scatterers suitable for being transferred onto a flexible substrate. The scatterers, or scattering elements, can be peeled off, for example, using a thin layer of polydimethylsiloxane (PDMS). The measurement results obtained from these exemplary metasurfaces show the high performance achievable using fabricated conformal optical metasurfaces.

Physical geometry and optical properties of objects are correlated: cylinders focus light to a line, spheres to a point, and arbitrarily shaped objects introduce optical aberrations. Multi-functional components with decoupled geometrical form and optical function are needed when specific optical functionalities must be provided while the shapes are dictated by other considerations like ergonomics, aerodynamics, or esthetics. The present disclosure demonstrates an approach for decoupling optical properties of objects from their physical shape using thin and highly transparent flexible dielectric metasurfaces which conform to objects' surface and change their optical properties. The conformal metasurfaces can be composed of silicon nano-posts embedded in a polymer substrate, where the nanoposts locally modify the optical wavefronts. For example, cylindrical lenses covered with metasurfaces can be transformed to function as aspherical lenses focusing light to a point. The conformal metasurface concept introduces a novel paradigm for developing arbitrarily shaped multi-functional optical devices.

The correlation between the geometry of an object and its optical functionality, see Ref. [7], has introduced long-standing design challenges to optical engineers developing multi-functional components, see Ref. [8]. The traditional solution has been to compromise and optimize the component material and geometry by considering all the physical requirements. This issue was originally studied in the context of conformal and freeform optics where optical components with non-standard surfaces were developed for integration of optics into flying objects with specific aerodynamic shapes, see Refs. [9,10]. More recently, the issue has attracted new attention due to its application in the integration of optics into various consumer electronic products and medical equipment with stringent packaging and design requirements. Furthermore, controlling optical properties of objects without physically modifying them can enable the visual blending of an object with its background, see Refs. [11-14], or changing its appearance through the generation of a holographic virtual image, see Refs. [15,16]. In the context of conformal optics, the conventional solution is to stack several bulky optical elements with non-standard surface profiles underneath the outermost surface of the object, see Ref. [10]. Such solutions usually have challenging fabrication processes requiring custom-made and bulky fabrication equipment, and do not provide a unified and versatile approach that can be applied to arbitrary geometries. The flexible metasurface based approach demonstrated in the present disclosure provides a general solution and allows decoupling of geometric shape and optical characteristics of arbitrary objects.

Metasurfaces are two dimensional arrays of scatterers rationally designed to locally modify phase and polarization of electromagnetic waves, see Refs. [17-20]. Metasurfaces enable wafer-scale production of lithographically-defined thin diffractive optical elements using conventional nano-manufacturing techniques. These manufacturing techniques are optimized for patterning flat substrates and are not normally applicable for direct fabrication of metasurfaces on non-planar structures required for conformal optics. However, the two dimensional nature and the minute thickness of optical metasurfaces make them suitable for transfer to non-planar substrates. Several different plasmonic and dielectric metasurface platforms for optical wavefront manipulation have been recently proposed, see Refs. [17-24].

Among different platforms, dielectric metasurfaces based on high contrast transmitarrays are highly versatile, see Refs. [20, 23, 24], as they provide simultaneous manipulation of phase and polarization of light with high efficiencies, and can sample optical wavefronts with sub-wavelength spatial resolution, see Ref. [20]. Several efforts have been made to transfer metasurfaces (mostly plasmonic ones) to flexible substrates with the aim of tuning their optical response using substrate deformation, see Refs. [25-29]. Plasmonic metasurfaces, however, have low efficiencies especially in transmission mode, which in many situations make them impractical. The present disclosure introduces flexible metasurfaces based on a dielectric high contrast transmitarray platform that can be conformed to a nonplanar arbitrarily shaped object to modify its optical properties at will.

Figure 1:
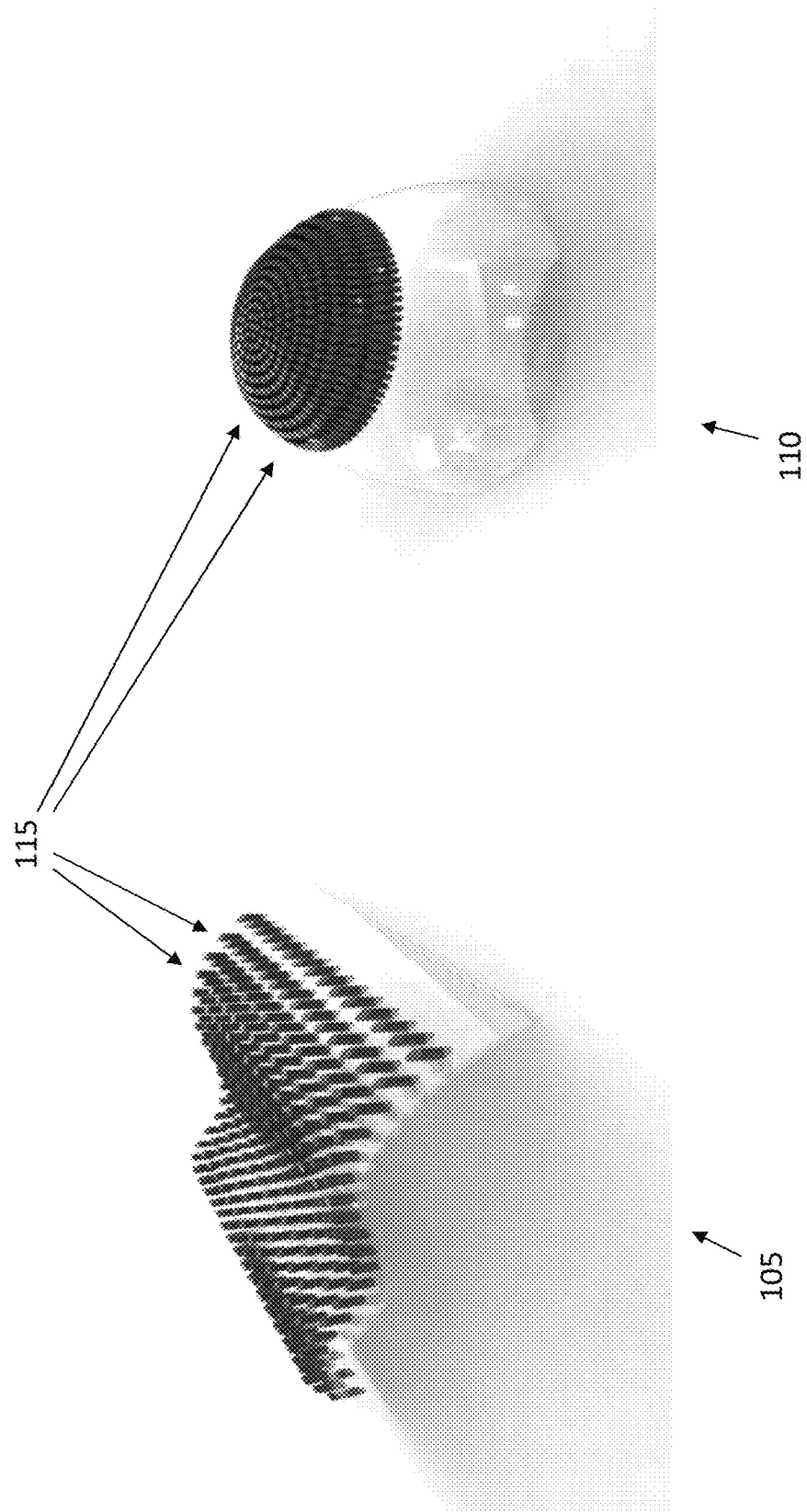
FIG. 1 shows a schematic illustration of a metasurface on two different nonplanar substrates.

The capacity to conform optics to a curved or flexible surface is a desired capability not fully achievable via conventional optical devices. However, the structure of some optical metasurfaces makes them very suitable for use in flexible and conformal platforms. In the present disclosure metasurfaces are employed, for example as described in Ref. [1]. The metasurface structure is composed of discrete micron or submicron scale amorphous silicon (a-Si) scatterers. The small size and discreteness of the scattering elements renders it a perfect candidate for being transferred to a flexible substrate. Unlike flexible electronics, contacts and connections between distinct elements are not needed, as there are no electrical connections between elements and each element works almost independently. FIG. 1 shows a schematic illustration of a metasurface on two different nonplanar substrates: a lens (105) designed for a nonplanar surface, and a microlens (110) mounted on a half sphere to correct coma aberration. In FIG. 1, linear or circular rows of scattering elements (115) are arranged on a flexible or curved substrate.

In the example of FIG. 1, the building blocks of the metasurfaces are cylindrical posts, made of a-Si as a high refractive index dielectric material. The low refractive index of PDMS surrounding the scatterers provides the high index contrast needed for the optical operation of the metasurfaces. The design procedure of a flat metasurface working as a high efficiency microlens is described for example in Ref. [1]. The procedure described in Ref. 1 has been modified, according to the present disclosure, to design the microlenses for operation on a nonplanar surface instead of a flat surface. After determining the desired dimensions and positions of the scattering elements, the device is fabricated on a flat substrate using standard nanofabrication techniques such as the one described in Ref. [1]. The next steps are then spinning a thin layer of PDMS on the device, putting it in a sonication bath for a duration of time, and peeling the a-Si scatterers off the original substrate using the PDMS layer.

In other words, the PDMS layer deposited on top of the scattering elements acts as a matrix that holds the elements together when separated from the original substrate. The scattering elements can then be attached to a flexible or curved surface.

The sonication step increases the peel off yield by weakening the adhesion between the elements and the substrate. The scatterers will then remain in the flexible PDMS layer as they are embedded in polymer. FIG. 2 illustrates an SEM image of a fabricated microlens (before peeling off with PDMS, 205) and a planar microlens on a flexible substrate (210). FIG. 2 shows an SEM micrograph of a fabricated microlens on a flat substrate (205), and an optical picture (210) of the microlens after being transferred to the flexible substrate. The device can then be mounted on the designated curved surface.

Figure 3:
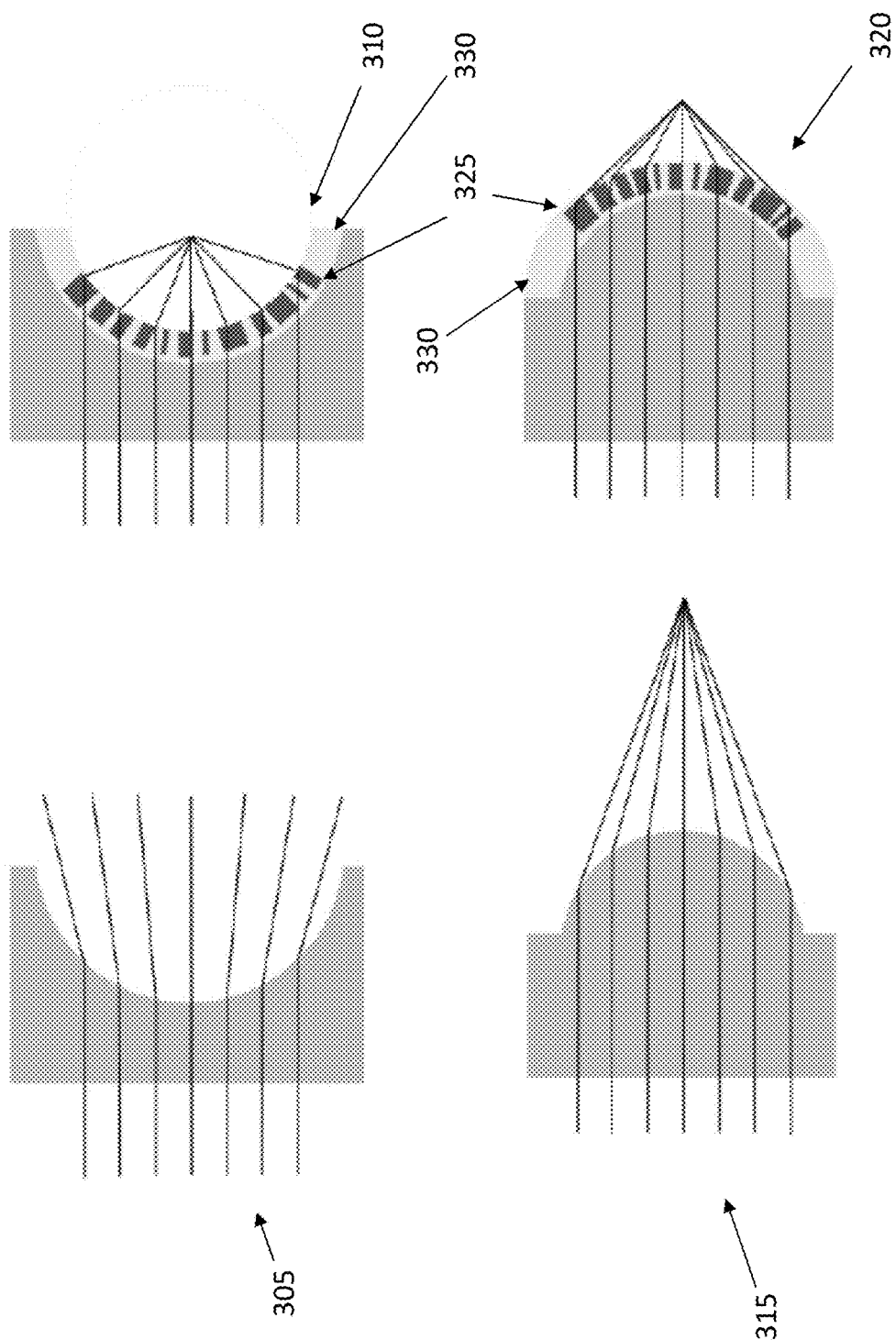
FIG. 3 illustrates exemplary metasurface lenses.

As an example of the possible applications, a metasurface microlens can change the optical functionality of cylindrical lenses (conventional refractive lenses) to function as a converging spherical lens. This example is illustrated in FIG. 3. In FIG. 3, light rays are illustrated as diverging after propagating through a concave cylindrical lens (305). By attaching a metasurface on the surface of the cylindrical lens (305), a metasurface microlens can be obtained (310). The conformal microlens, or conformal metasurface, is attached to the concave cylindrical substrate and can significantly change the optical properties of the substrate. For example, a metasurface can change the focal length of a spherical lens.

FIG. 3 also illustrates light converging after propagating through a convex cylindrical lens (315). As visible in FIG. 3, a metasurface may comprise scattering elements (325) in a polymer layer (330). The scattering elements may be completely embedded in the polymer layer, or they may have a surface not covered by the polymer, on the side that is attached to the lens whose properties need to be modified.

FIG. 3 further illustrates a conformal microlens on a convex cylindrical substrate (320), where the conformal metasurface microlens can change the optical property of the substrate, for example by changing the focal length of the spherical lens from (315) to (320).

According to the present disclosure, it is also possible to fabricate and transfer microlenses that are designed to work when mounted on a flat substrate. An exemplary device that can operate on a flat surface is shown in FIG. 2, while exemplary devices designed for the cylindrical surface are shown in FIG. 4.

Figure 4:
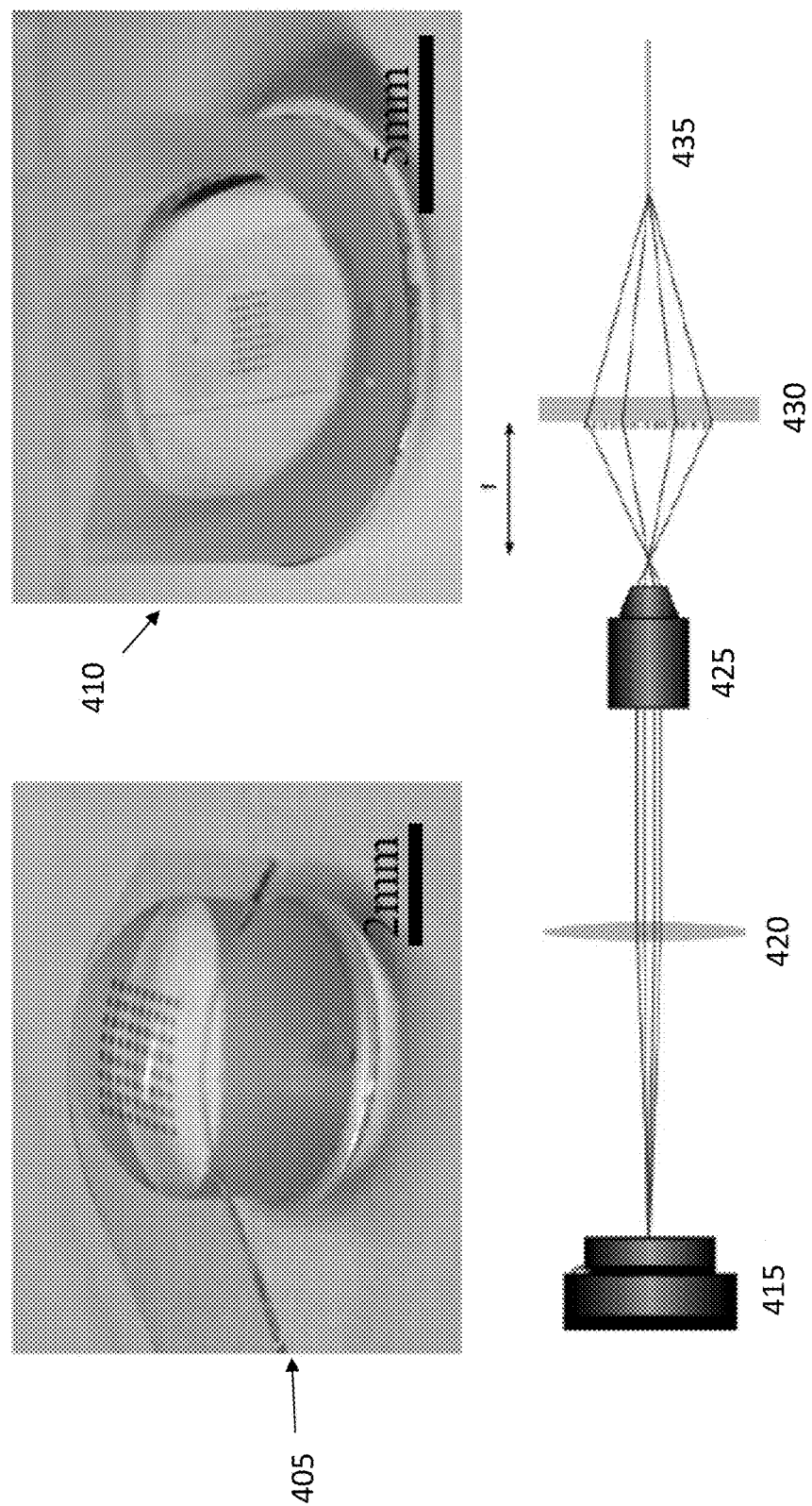
FIG. 4 illustrates exemplary metasurface lenses and a measurement setup.

FIG. 4 illustrates an exemplary fabricated spherical microlens mounted on a convex cylindrical lens (405). FIG. 4 also illustrates a fabricated spherical microlens mounted on a concave cylindrical lens (410). FIG. 4 further illustrates a measurement setup comprising a camera (415), a tube lens (420), an objective lens (425), a nonplanar microlens comprising a metasurface (430) and a cleaved fiber (435) to collect the transmitted light.

Figure 5:
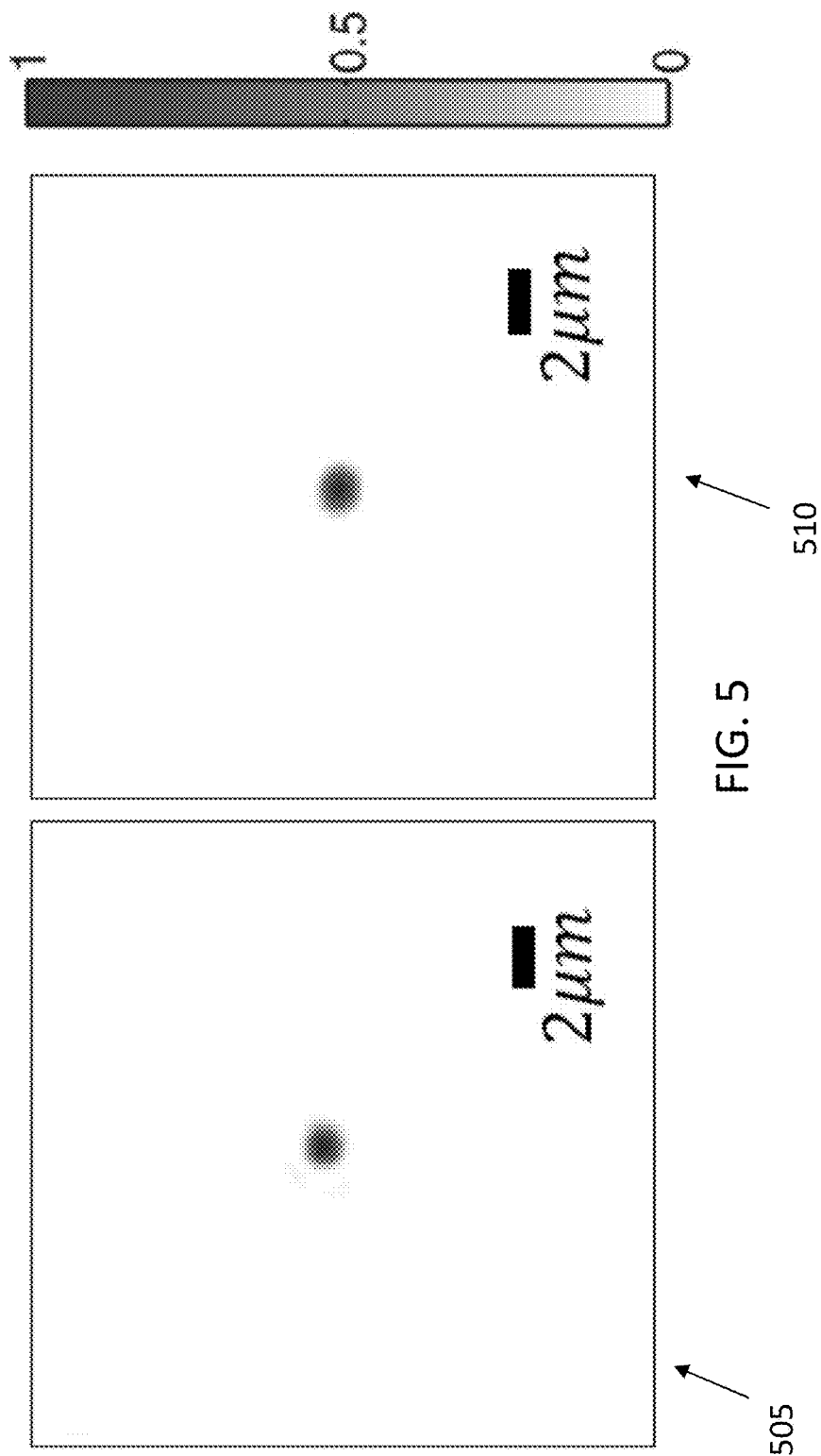
FIG. 5 illustrates exemplary measurements.

FIG. 5 illustrates the measured intensity at the focal plane of a spherical microlens on a concave cylindrical substrate (505), as well as the measured intensity at the focal plane of a spherical microlens on a flat substrate (510). The measured focal spots for both the flat and curved devices approach their diffraction limit and show the performance and capabilities provided by conformal metasurfaces in achieving desired optical functionalities over arbitrary nonplanar substrates.

Nonplanar metasurfaces provide a new degree of freedom, useful in designing innovative metasurfaces with new functionalities, or improving some characteristics of existing ones. For instance, a single metasurface lens (as well as a conventional refractive lens) suffers from coma aberration, which means an oblique incident beam is focused into a distorted spot. However, mounting a spherical aberration-free metasurface on a spherical surface can correct its coma aberration, see Ref. [6]. FIG. 6 illustrates a flat microlens with coma aberration. In FIG. 6, an oblique beam is incident at an angle on a surface of a lens, comprising a lens (610), a polymer matrix (615) and scattering elements (620). The beam (605) is focused in a distorted spot (625) due to aberration.

FIG. 6 also illustrates an oblique beam (630) incident at an angle on a lens (635), comprising a matrix (640) and scattering elements (645). The beam (630) is focused (650) without aberration. Therefore, it is possible to correct coma aberration by mounting the metasurface microlens on a spherical surface.

FIG. 6 shows how the aberration can be corrected by conforming the flexible lens to a spherical surface. The metasurfaces lens can be designed to have no spherical aberration, mounting it on the spherical surface corrects its coma aberration.

Figure 7:
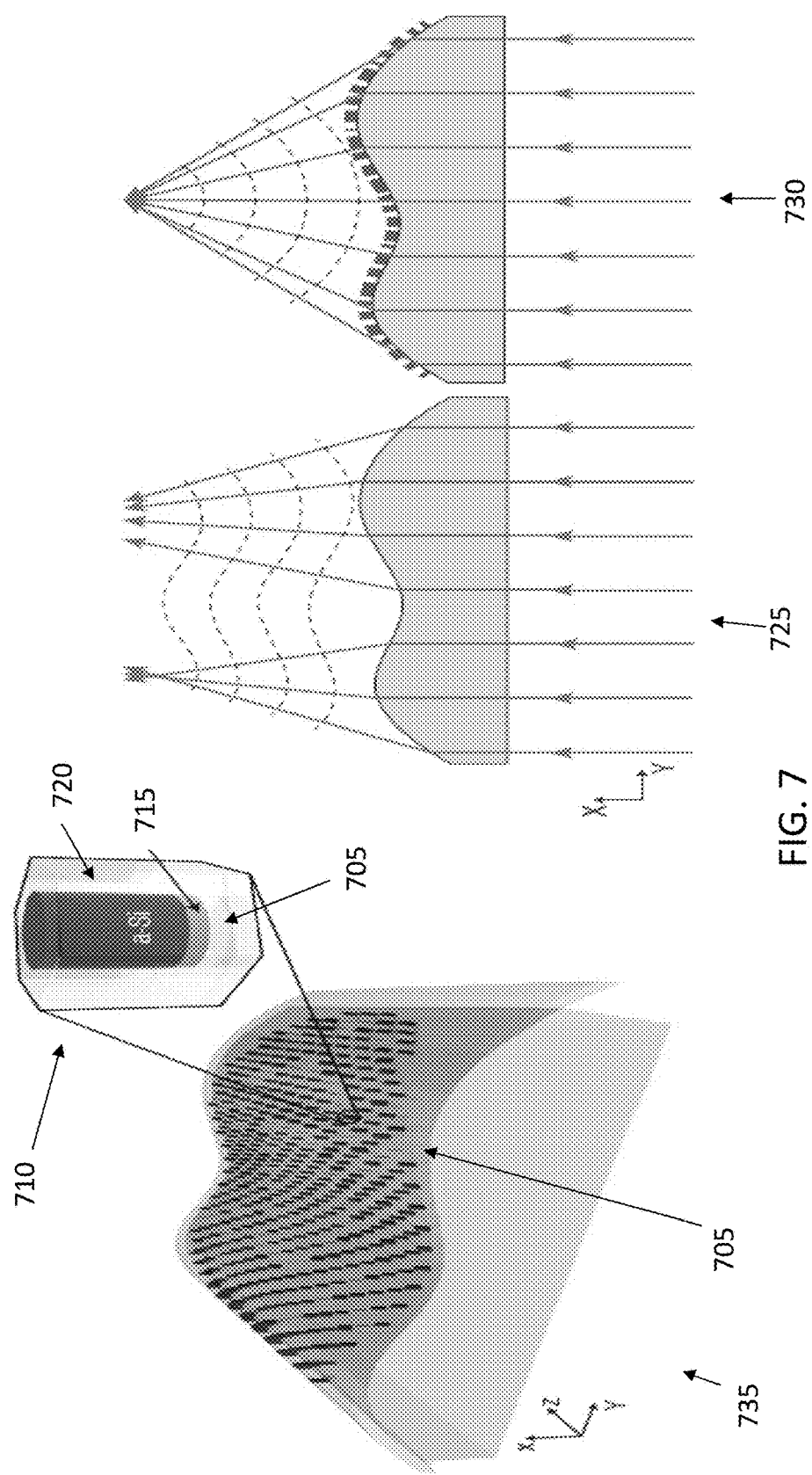
FIG. 7 illustrates conformal optics with optical dielectric metasurfaces.

FIG. 7 shows a schematic illustration of a non-planar arbitrarily shaped transparent object wrapped by a flexible metasurface based on the platform described in the present disclosure. The metasurface layer is composed of an array of dissimilar cylindrical amorphous silicon (a-Si) nano-posts with different diameters placed on a sub-wavelength periodic hexagonal lattice, and embedded in polydimethylsiloxane (PDMS) as a flexible substrate. FIG. 7 illustrates the flexible PDMS substrate (705). A single nanopost is illustrated in detail (710). In some embodiments, an $Al_2O_3$ layer (715) is between the PDMS and the a-Si post (720).

The arbitrary shape of the object surface distorts the wavefront of transmitted light in an undesirable way (725). By conforming the metasurface onto the object's outer-most surface, the distortion can be compensated and the wavefront of the transmitted light can be shaped to a desired form, similar to phase compensating antenna arrays employed in the microwave regime, see Ref. [30]. For example, the metasurface can be designed to correct the distortions introduced by the arbitrarily shaped object and make the lens act similarly to an aspherical lens that focuses light to a point as schematically shown in (730).

FIG. 7 illustrates conformal optics with optical dielectric metasurfaces. A schematic illustration is shown (735), of a dielectric metasurface layer conformed to the surface of a transparent object with arbitrary geometry. The building block of the metasurface structure comprise amorphous silicon nano-posts on a thin layer of aluminum oxide embedded in a low index flexible substrate (PDMS for instance). FIG. 7 also illustrates a side view of the arbitrarily shaped object showing how the object refracts light according to its geometry and generates an undesirable phase front (725). The same object with a thin dielectric metasurface layer conformed to its surface to change its optical response to a desired one is also shown (730).

The desired phase profile of the conformal metasurface is found with the knowledge of the geometry of the transparent object over which it is wrapped, and the desired optical response. First, the object without the metasurface is considered, and the phase profile of the optical waves transmitted through the object is computed along the surface of the object. For objects with dimensions significantly larger than the optical wavelengths, this phase profile can be found using ray optics approximation and by computing the optical path length and the corresponding optical path difference (OPD) of the rays passing through different points along the outermost surface of the object with respect to the chief ray. Then, using a similar OPD-based approach, the phase profile required to achieve the desired specific functionality is obtained along the surface of the object. For example, if the object is to focus light to a point, a converging spherical wavefront is desired, which is sampled along the arbitrary surface of the object. The metasurface layer wrapped on the surface of the object should locally impose an additional optical phase shift equal to the difference between the original phase of the object and the desired phase profile. Therefore, the desired metasurface phase profile is expressed as a function of two coordinate values defining the non-planar surface of the object. To obtain the appropriate phase profile of the metasurface before its transfer to the non-planar surface, an appropriate coordinate transformation should be applied. For example, if the flexible substrate of the metasurface is under no stress after being mounted on the object's surface, then the appropriate coordinate transformation conserves length along the surface of the object.

Figure 8:
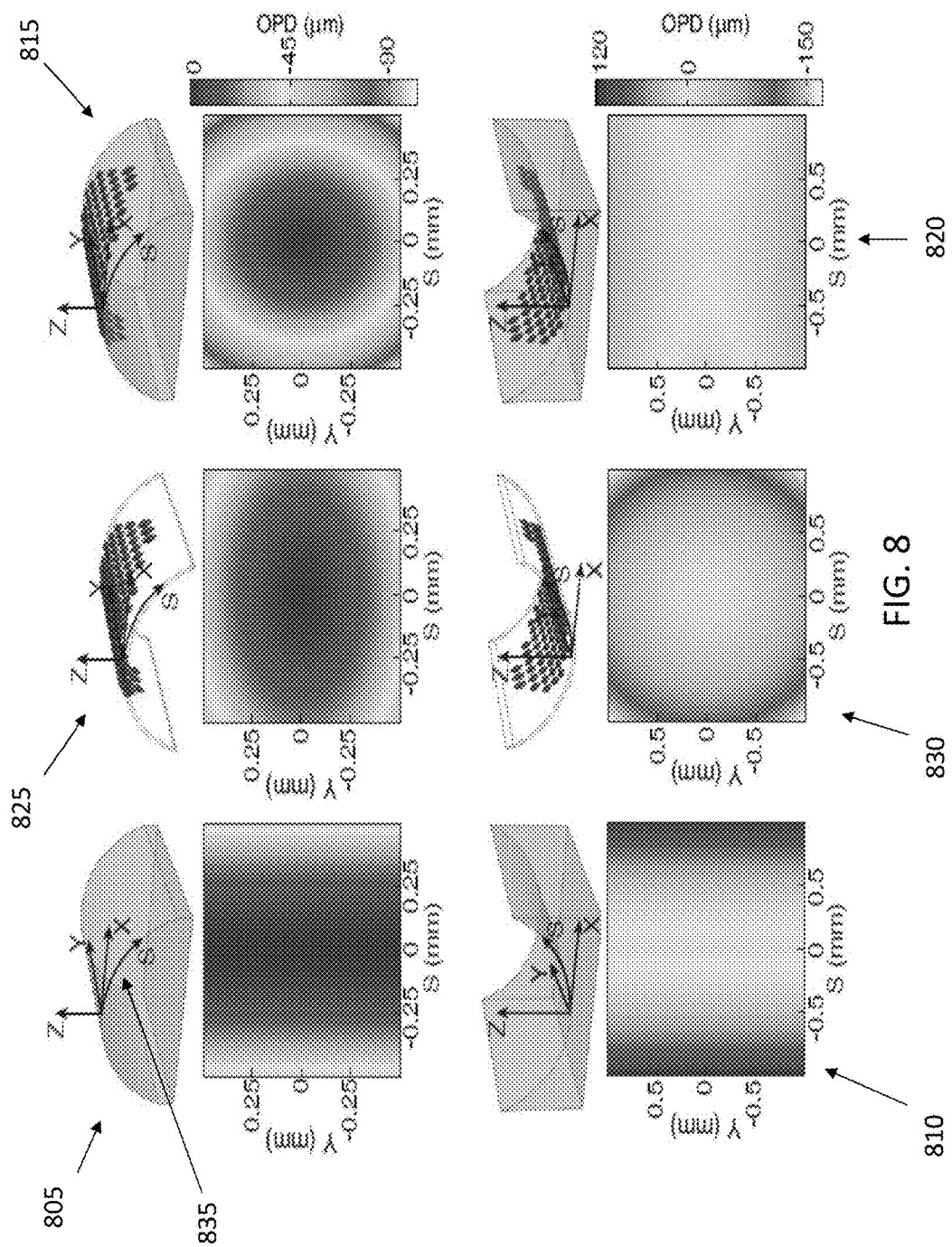
FIG. 8 illustrates calculations of metasurfaces to modify the optical properties of cylinder lenses.

Using this design procedure, it is possible to compute two sets of conformal metasurface phase profiles for both a convex and a concave cylindrical glass. The metasurfaces modify the wavefronts of the cylindrical objects to make them behave as aspherical lenses. FIG. 8 illustrates (805, 810) shows the OPD of the rays passing through the convex (concave) cylinder at its top surface. Considering the desired converging spherical wavefront, the desired OPD of the rays at the surface of the convex (concave) cylinder is calculated and shown in (815,820). The difference between the OPDs of the convex (concave) cylindrical object and the converging spherical phase profile is shown in (825,830). The conformal metasurfaces can impose phase shifts equivalent to these OPDs at the operation wavelength. Since the cylindrical surfaces are isometric with a plane, the metasurfaces can be mounted on the cylindrical surfaces under negligible stress. Therefore, a simple geometric transformation, XY to SY in (805) can be used to map the coordinates on a cylinder surface to a plane.

Figure 9:
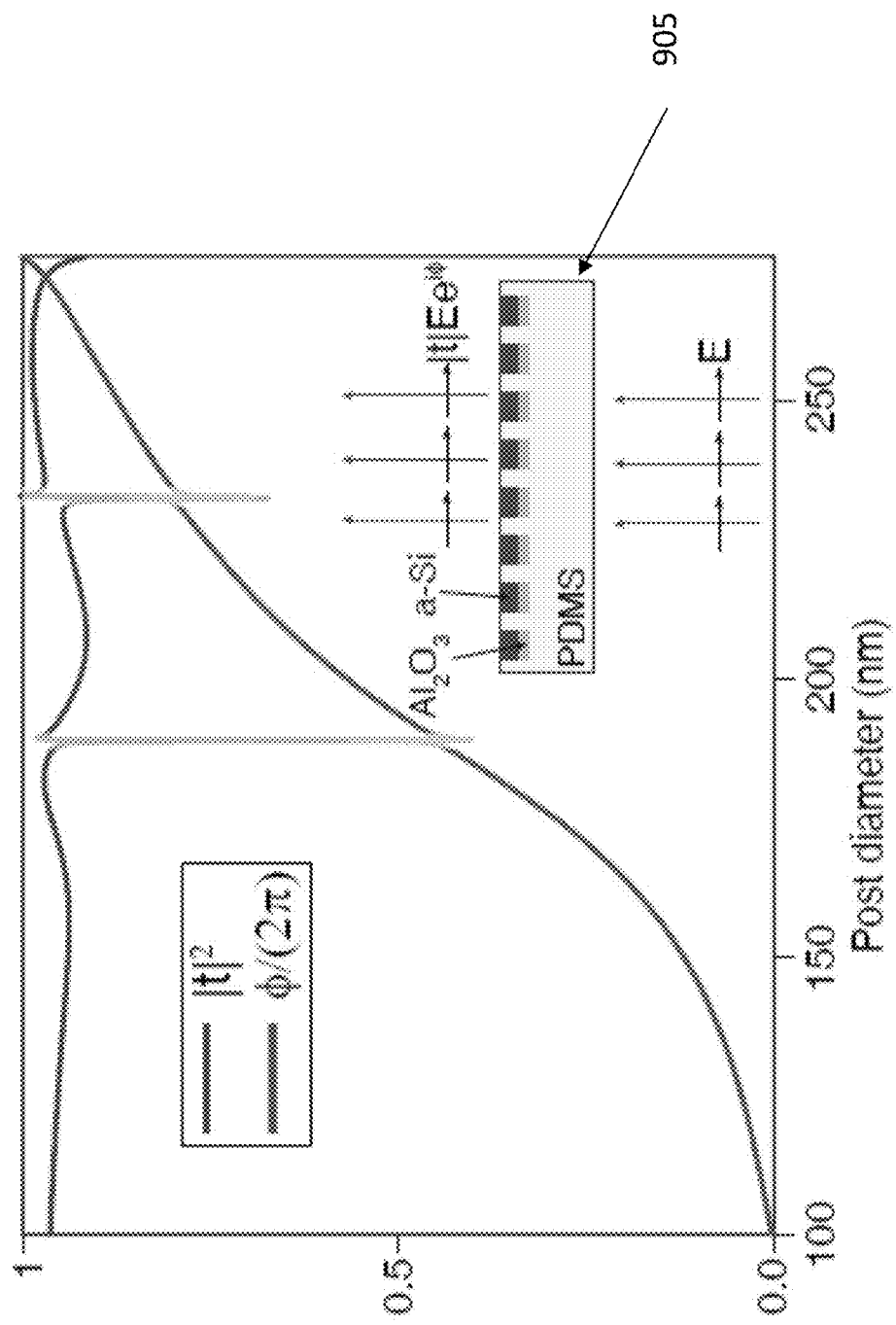
FIG. 9 illustrates the simulated amplitude and phase of the transmission coefficient for periodic arrays of 720 nm tall nano-posts embedded in PDMS with diameters ranging from 100 to 275 nm.

The optical coupling among the nano-posts is weak in the high contrast transmitarray metasurface platform, see Ref. [20], and each nano-post scatters light almost independent of its neighboring posts. This fact simplifies the design by allowing to directly relate the local transmission coefficient to the diameter of the post at each unit cell of the metasurface. FIG. 9 illustrates the simulated amplitude and phase of the transmission coefficient for periodic arrays of 720 nm tall nano-posts embedded in PDMS with diameters ranging from 100 to 275 nm. The posts are arranged, in this example, in a hexagonal lattice with 550 nm lattice constant, and the simulation wavelength is 915 nm. The whole 0 to $2\pi$ phase range can be covered by changing the post diameters while keeping the intensity transmission coefficient above 91%. These results are obtained assuming normal incidence. Low sensitivity to the incident angle is a necessary property for a conformal metasurface since the incident angle would be varying across the metasurface when it is wrapped over a non-planar object.

For the metasurface platform considered described in the present disclosure, the transmission coefficient of transverse electric (TE) polarized light is weakly dependent on the incidence angle, and the transmission coefficient of transverse magnetic (TM) polarized light shows some angle dependent resonances. These resonances introduce a small phase error and lower transmission, but as experimentally shown, these resonances only slightly reduce the metasurface efficiency for TM polarization. For very steep angles, the metasurface efficiency decreases as analyzed in Ref. [23]. The general metasurface design procedure is as described in the following. First, the coordinate-transformed desired metasurface phase was sampled at the lattice sites of the periodic hexagonal lattice. Then, the diameter of the nano-post at each site was obtained using the corresponding sampled phase value at that site and the phase-diameter relation shown in FIG. 9. To ensure a one to one relationship between the phase and post diameters, and to keep the transmission high, post diameters corresponding to the sharp resonances in FIG. 9 were not used. Using this procedure, metasurfaces with phase profiles shown in (825) and (830) were designed to be conformed to convex and concave cylindrical objects. These metasurfaces modify the optical response of the cylinders such that they behave as aspherical lenses and focus light to single points.

As described above, FIG. 8 illustrates a design procedure for conformal metasurfaces. The OPD (in μm) of the rays passing through a converging cylindrical object is illustrated in (805). The difference OPD needed at the surface of the convex cylindrical object compensated by the conformal metasurface is illustrated in (825). The desired OPD at the surface of the object which is provided by the combination of the object and the conformal metasurface, as shown in (815). Similar plots for a diverging cylinder are illustrated in (810,830,820). The arch length on the cylinder surface in a plane perpendicular to the y axis is illustrated for each surface (835).

FIG. 9 illustrates a simulated intensity transmission and phase of the transmission coefficient for a periodic array of a-Si nano-posts embedded in PDMS as shown in (905). The nano-posts are composed of 720 nm a-Si on 100 nm $Al_2O_3$, and are arranged in a hexagonal lattice. The graph of FIG. 9 is used to relate the phase shift values (and respective OPDs) needed at different points on the conformal metasurface to the post diameters.

Figure 10:
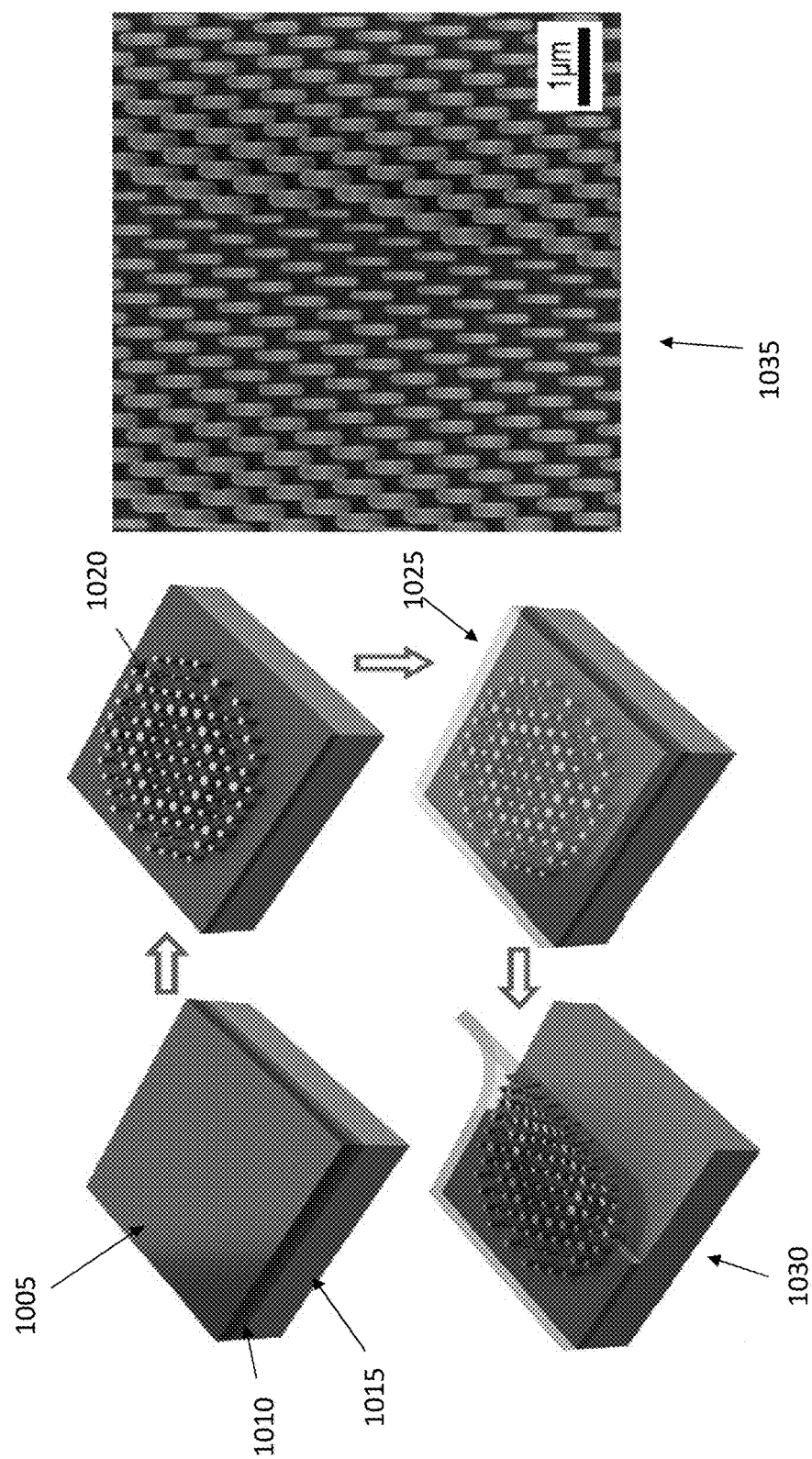
FIG. 10 schematically illustrates the key steps in fabricating thin, flexible, and conformable metasurfaces.

FIG. 10 schematically illustrates the key steps in fabricating thin, flexible, and conformable metasurfaces. A germanium sacrificial layer (1010) is deposited on a silicon wafer (1015) and subsequently an a-Si layer (1005) is deposited over the germanium. The a-Si layer is patterned using electron beam lithography followed by dry etching using an alumina hard mask (1020). The sample is subsequently spin coated with two layers of PDMS (1025). The PDMS layer can comprise a diluted thin layer followed by a thicker layer.

Subsequently, the sample is immersed in a diluted ammonia solution which dissolves the germanium layer and releases the flexible metasurface with minimal degradation of the metasurface and of the PDMS layer (1030). A scanning electron microscope image of the fabricated device before spin coating the PDMS layer is shown in (1035). Optical images of meta-surfaces conformed to the convex and concave glass cylinders are shown in FIG. 11. In both cases, the metasurfaces make cylinders behave like converging aspherical lenses.

The whole fabrication process has a near unity yield, with almost all of the metasurfaces retaining a large majority of the nano-posts. Moreover, the process does not degrade the optical quality of the metasurface layer. The optical quality of the flexible metasurface layer was tested by transferring a flat metasurface lens to a flat substrate.

To demonstrate the capabilities of this platform, two different conformal metasurfaces operating at the near infrared wavelength of 915 nm were fabricated and characterized. The first 1-mm diameter metasurface conforms to a converging cylindrical lens with a radius of 4.13 mm. The cylinder by itself focuses the light to a line 8.1 mm away, as shown in FIG. 12 (1205). The presence of the metasurface (1210) modifies the cylinder to behave as an aspherical lens focusing the light to a point 3.5 mm away from the surface of the cylinder. The second device is a 2-mm diameter metasurface conforming to a diverging glass cylinder with a radius of 6.48 mm and a focal length of −12.7 mm, see FIG. 13. With the metasurface on top, the concave cylinder focuses the light to a point 8 mm away from the cylinder surface (1310).

The devices in FIGS. 12 and 13 were characterized under collimated laser beam illumination by recording intensity profiles at different planes parallel to their focal planes. FIGS. 12 and 13 show such normalized measured intensity profiles. The focal plane intensity profiles are shown in (1215) and (1315). A tight focus is observed at the designed focal length. Focusing efficiencies of 56% and 52% under TE illumination (i.e. electrical field parallel to the cylinder axis) were measured for the two devices, respectively. The focusing efficiency is defined as the ratio of the power focused by the device to the incident power on the device. Under TM illumination, numerical estimations based on the angular response of a uniform array indicate only a slight degradation of the device performance for larger angles between the metasurface and the incident beam. The devices were measured with TM input beam polarizations and, as expected, showed similar behavior as under TE illumination with focusing efficiencies of 56% and 50%. The difference in TE and TM polarization efficiencies increases as incidence angle becomes steeper; the focus pattern, however, remains almost the same under both polarizations, as shown in the following. The corresponding measured full width at half maximum (FWHM) of the focal spots are approximately 3.5 μm and 5 μm comparable to diffraction limited FWHM of 3.2 μm and 3.7 μm, respectively. Slight aberrations observed in the focal plane intensity profiles are mostly due to imperfections in the alignment of the metasurface to the non-planar substrates.

Although in the above examples cylindrical substrates were described as proof of principle, the structures of the present disclosure are not limited to surfaces that can be projected to a plane using isometric transformations. Conformal metasurfaces can be designed for other types of objects (for instance spheres where the metasurface needs to be stretched for conforming) with a similar method. In such cases, however, it would be useful to carry out a mechanical analysis of the metasurface deformation upon mounting on the object. The coordinate transformation that projects the conformal lattice to the planar one should also account for this deformation. Besides, in the case of objects with steep angles (where the incident collimated beam is far from normal to the metasurface at some points), further considerations should be taken in choosing the lattice constant to avoid excitation of higher order diffractions. Moreover, since the design procedure is local (i.e. each nano-post at each lattice site is chosen independently), the incident angle of the beam at each lattice point can be taken into account in designing the respective nano-post.

In the present disclosure flexible dielectric metasurfaces have been described, as well as their applications for conformal optics. As proof of concept, the optical properties of glass cylinders have been changed to behave like aspherical lenses focusing light to a point. The design paradigm can be applied to any other system where conformal optical design is required. In addition, flexible electronics is a well-established field of research, with the aim of transferring conventional systems to flexible and non-planar substrates. Very promising results have been achieved during the last decade with various applications in wearable electronics, electronic skins, and medical devices, see Refs. [31-33]. The flexible and conformal metasurface platform proposed here can be merged with conformal electronics leading to versatile flexible optoelectronic technologies.

The optical path length and the corresponding optical path difference of light passing through the cylinders were computed using ray optics approximation. For simulations, the convex and concave cylinders were assumed to have radii of 4.13 mm and 6.48 mm, respectively, and a refractive index of 1.507. The PDMS layer was modeled as a 50-μm thick layer with a refractive index of 1.41. In both cases, the object OPDs were calculated at the outermost surface of the PDMS, considering light propagation through the PDMS layer and refraction at the glass-PDMS interface. The desired OPDs were also calculated at the same surfaces, assuming focal distances of 3.5 mm and 8 mm for the convex and concave lenses, respectively. Two exemplary, different metasurfaces of diameters 1 mm and 2 mm were designed for the convex and concave cylinders to impose the phase shifts equivalent to the difference of the cylinders' and the desired OPDs.

The planar periodic metasurfaces were simulated using the rigorous coupled wave analysis (RCWA) technique to find the complex transmission coefficients corresponding to all nanopost diameters for normal incident plane waves (FIG. 9), see Ref. [35]. The lattice constant is chosen such that the array is non-diffractive at the simulation wavelength. Simulation results shown in FIGS. 14-15 were also obtained using the RCWA technique. All of the simulations and calculations were performed at the wavelength of 915 nm.

FIGS. 14 and 15 illustrate the angular dependence of the transmission coefficient. FIG. 14 illustrates a schematic illustration of a uniform array of nano-posts embedded in PDMS (1420,1520) illuminated by an obliquely incident plane wave (1405,1505), and its simulated transmission amplitude and phase as a function of post diameter and incident beam angle for TE polarization in FIG. 14, and TM polarization in FIG. 15. The posts are made of a-Si (1410, 1510) over an alumina layer (1415,1515). The results show weak angular dependence of high contrast transmitarray metasurfaces for TE polarization in the range of angles involved in their operation. Some angular dependence for TM polarization results in slight degradation of the device performance. The maximum angle between the metasurface normal and the incident beam for the two metasurfaces discussed in the main text are 7° and 9°.

In some embodiments, the devices of the present disclosure can be fabricated as follows. A 300-nm thick germanium sacrificial layer was deposited by electron beam evaporation on a silicon wafer, and 720 nm hydrogenated a-Si was deposited on the germanium layer using plasma enhanced chemical vapor deposition (PECVD) with a 5% mixture of silane in argon at 200° C. The refractive index of the a-Si layer was measured using variable angle spectroscopic ellipsometry and was found to be 3.56 at the wavelength of 915 nm. The metasurface pattern was defined in ZEP-520A™ positive resist (about 300 nm, spin coated at 5000 rpm for 1 min) using a Vistec EBPG5000+™ electron beam lithography system. The pattern was developed in a resist developer (ZED-N50™ from Zeon Chemicals™). After developing the resist, the pattern was transferred into a 100-nm thick aluminum oxide layer deposited by electron beam evaporation through a lift-off process. The patterned aluminum oxide served as a hard mask for dry etching of the a-Si layer in a mixture of $SF_6$ and $C_4F_8$ plasma. The PDMS polymer (RTV-615 A and B mixed with a 10:1 mass ratio) was diluted in toluene in a 2:3 weight ratio as a thinner. The mixture was spin coated at 3000 rpm for 1 min on the fabricated metasurface to fill the gaps between the nano-posts and to form a thin PDMS film (Supplementary FIG. 2). The sample was degassed and cured for more than 30 mins. The second layer of PDMS without a thinner was spin coated on sample to form a 50-μm thick PDMS film (spin coated at 1000 rpm for 1 min).

The sample was degassed and cured for more than 1 hr. Finally immersion in a 1:1:30 mixture of ammonium hydroxide, hydrogen peroxide, and deionized water at room temperature removed the sacrificial germanium layer releasing the PDMS substrate and the embedded nano-posts (after a time of about one day). The released metasurface is then mounted manually on the cylin-ders (Edmund Optics™ 43-856 and 47-748). To compensate for the misalignment of the substrate and metasurface, multiple lenses with slightly different rotations were fabricated in each sample (FIG. 11). As a consequence, the best aligned microlens should have a rotation error of less than or equal to one degree (the rotation step between two successive metasurface lenses).

Devices were characterized using the setups shown schematically in FIG. 17, which shows a schematic illustration of the measurement setup used for characterization of the conformal metasurfaces. The setups used comprised a laser (1705), a polarization controller (1710), a fiber collimator (1715), a neutral density filter (1720), a metasurface device (1725), an objective lens (1730), a tube lens (1735), a second neutral density filter (1740), a camera (1745). FIG. 17 also illustrates a schematic diagram of the experimental setup used for measuring the efficiencies of conformal metasurfaces, comprising similar elements as described above, in addition to a lens (1722), a pinhole (1727) and an optical power meters (1750). A 915 nm fiber coupled semiconductor laser was used as the source with a fiber collimation package (Thorlabs F220APC-780™) used to collimate the beam. Intensity at different planes was captured by using a 50× objective lens (Olympus™ LMPlanFL N, NA=0.5), a tube lens (Thorlabs™ LB1945-B) with focal distance of 20 cm, and a camera (CoolSNAP K4 from Photometrics™) as shown in FIG. 17. Moreover, neutral density (ND) filters (Thorlabs™ ND filters, B coated) were used to adjust the light intensity and decrease the background noise captured by the camera. The overall microscope magnification was measured by imaging a calibration sample with known feature sizes. To measure the efficiencies, an additional lens (Thorlabs™ LB1945-B with focal length of 20 cm) was used to partially focus the collimated beam, so that more than 99% of the beam power falls inside the device under test. The beam radius was adjusted by changing the distance between the lens and the sample. A 15 μm diameter pinhole (approximately three times the measured FWHM) was placed at the focal plane of the sample to only allow the light focused inside the pinhole area to pass through. The focusing efficiency was then determined as the ratio of measured optical power after the pinhole (i.e. the power in focus) and the measured power right before the sample (the incident power). The measurement setup used for efficiency characterization is shown in FIG. 17. For polarization sensitivity measurements, a polarizer (Thorlabs™ LPNIR050-MP) was added before the sample to set the polarization state of the incident beam.

FIG. 16 illustrates the preservation of high efficiency and diffraction limited optical performance of the metasurfaces through the transfer process. A metasurface lens designed to operate as an aspherical lens when mounted on a flat substrate is transferred to a PDMS substrate (1605). The metasurface lens has a diameter of 200 μm and a focal distance of 200 μm. The focal plane intensity profile is measured when the flexible metasurface is mounted on a flat glass substrate and illuminated with a collimated beam (1610). The measured FWHM spot size of 1 μm agrees well with the diffraction limited FWHM spot size of 1 μm. The focusing efficiency of the lens was measured as 78.5%. The diffraction limited spot size and the relatively high focusing efficiency verifies the fidelity of the fabrication process in preserving optical properties of metasurfaces. Measurements are performed at the wavelength of 915 nm. In FIG. 16, a Si substrate (1615) is shown, with a Ge layer (1620), a PDMS layer (1625,1645), a-Si posts (1630, 1635), and a glass substrate (1640).

To preserve the high efficiency and the diffraction limited optical performance of the metasurfaces through the transfer process to the PDMS substrate, it is essential that a large majority of the posts are transferred, and the gaps between the posts are uniformly filled with PDMS. The efficiency of the metasurface decreases and wavefront aberrations are introduced if some of the posts are not transferred because the portion of the light passing through the areas with missing posts does not undergo the proper phase shift. Air voids between the posts also degrade the efficiency and cause wavefront aberrations by disturbing the near-field optical distributions of the posts which in turn leads to a lower local transmission efficiency and an incorrect phase shift. To verify that all the posts are transferred to the flexible substrate, after the transfer process, the metasurfaces were examined using an optical microscope. It can be observed that all the posts were successfully transferred as it is shown in FIG. 18, which shows an optical microscope image of a portion of a flexible metasurface. Complete embedding of amorphous silicon nano-posts in PDMS can be noted. An optical microscope image (1805) of a portion of the fabricated conformal metasurface lens after transferring to a flexible substrate is shown in FIG. 18. This image shows that almost all of the nano-posts are retained in the transfer process. A scanning electron microscope image (1810) of a portion of a flexible metasurface, taken at a tilt angle of 30 degrees is also shown in FIG. 18. The image shows that silicon nano-posts are entirely embedded in the flexible substrate (PDMS), and void-free filling of the gaps between the nano-posts with PDMS. To dissipate charge accumulation during scanning electron imaging, a 15 nm-thick gold layer was deposited on the sample prior to imaging. The cracks seen in the gold layer at the position of the nano-posts were not present initially and were gradually formed as the sample was exposed to the electron beam.

To demonstrate the accuracy achievable in setting the focal length and shaping the optical wavefront using conformal metasurfaces, a conformal metasurface was designed, which conforms to the convex surface of a cylindrical converging lens and shapes the wavefront such that light is focused to a point in the same focal plane as the original focal plane of the cylindrical lens. A metasurface with the diameter of 2 mm was designed, fabricated, mounted, and characterized using the same methods discussed in the main text. FIG. 19 shows schematic illustrations of the converging cylinder with and without the meta-surface layer. The converging cylinder without the metasurface layer focuses light to a line 8 mm away from the cylinder, and with the metasurface focuses it to a point at the exact same distance. A side view (1905) and top view (1910) are illustrated.

FIG. 20 shows the measured intensities at different planes parallel to the focal plane for the metasurface covered cylinder. Intensities at the focal plane with the metasurface (2005) and without the metasurface (2010) are shown in FIG. 20. The measured FWHM spot size at the focal plane is approximately 4.5 μm which is comparable to diffraction limited FWHM spot size of 3.7 μm. For the metasurface cylinder combination, by using a setup shown in FIG. 17, focusing efficiencies of 68% and 64% were measured for TE and TM polarizations, respectively.

FIG. 21 illustrates the effect of input beam polarization on device performance. The intensity pattern is measured at the focal plane of three different conformal metasurfaces (2115, 2120,2125) with TE (2105) and TM (2110) polarizations: a 1 mm metasurface on a convex cylinder with a 3.5 mm focal distance; a 2 mm metasurface on a concave cylinder with a 8 mm focal distance; and a 2 mm metasurface on a convex cylinder with a 8 mm focal distance. Focus pattern shows very negligible polarization dependence for all of the devices. The measured efficiencies, however, are more sensitive to polarization. The 1 mm metasurface with a maximum beam incidence angle of 7° has an efficiency of about 56% for both polarizations, while for the 2 mm metasurface lens on convex cylinder with maximum incidence angle of 14° the efficiency drops from 68% for TE polarization to 64% for TM polarization. Besides, the metasurface lens on the concave cylinder with a maximum beam incidence angle of 9° has efficiencies of 52% and 50% for TE and TM polarizations, respectively. This is in accordance with the angular dependence of transmission coefficient as shown in FIGS. 14 and 15. The device efficiency for TM polarization degrades as the angle between metasurface normal and incident beam increases. However, this does not affect the focus shape for any of the devices considerably.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] A. Arbabi, Y. Horie, A. J. Ball, M. Bagheri, and A. Faraon, "Subwavelength-thick Lenses with High Numerical Apertures and Large Efficiency Based on High Contrast Transmitarrays," arXiv:1410.8261 [physics.optics], 2014.

[2] A. Arbabi, Y. Horie, M. Bagheri, and A. Faraon, "Complete Control of Polarization and Phase of Light with High Efficiency and Sub-wavelength Spatial Resolution," arXiv:1411.1494 [physics.optics], 2014.

[3] A. Arbabi, M. Bagheri, A. Ball, Y. Horie, D. Fattal, and A. Faraon, "Controlling the Phase Front of Optical Fiber Beams using High Contrast Metastructures," in CLEO: 2014.

[4] A. Arbabi, Y. Horie, M. Bagheri, and A. Faraon, "Highly efficient polarization control using subwavelength high contrast transmitarrays," Proc. SPIE: 2015.

[5] A. Arbabi, Y. Horie, A. J. Ball, M. Bagheri, and A. Faraon "Efficient high NA flat micro-lenses realized using high contrast transmitarrays," Proc. SPIE 2015.

[6] F. Aieta, P. Genevet, M. Katsand, and F. Capasso, "Aberrations of flat lenses and aplanatic metasurfaces," Opt. Express, vol. 21, no. 25, pp. 31530-31539, December 2013.

[7] Born, M. & Wolf, E. Principles of Optics (Cambridge University Press, 1999).

[8] Thompson, K. P. & Rolland, J. P. Freeform optical surfaces: a revolution in imaging optical design. Opt. Photon. News 23, 30-35 (2012).

[9] Shannon, R. R. Overview of conformal optics. In AeroSense '99, 180-188 (SPIE, 1999).

[10] Knapp, D. J. Fundamentals of conformal dome design. In IODC 2002, 394-409 (SPIE, 2002).

[11] Ni, X., Wong, Z. J., Mrejen, M., Wang, Y. & Zhang, X. An ultrathin invisibility skin cloak for visible light. Science 349, 1310-1314 (2015).

[12] Fan, P. et al. An invisible metal-semiconductor photodetector. Nat. Photon. 6, 380-385 (2012).

[13] Valentine, J., Li, J., Zentgraf, T., Bartal, G. & Zheng, X. An optical cloak made of dielectrics. Nat. Mater. 8, 568-571 (2009).

[14] Ergin, T., Stenger, N., Brenner, P., Pendry, J. B. & Wegener, M. Three-dimensional invisibility cloak at optical wavelengths. Science 328, 337-339 (2010).

[15] Teo, J. Y. H., Wong, L. J., Molardi, C. & Genevet, P. Controlling electromagnetic fields at boundaries of arbitrary geometries. arXiv preprint arXiv:1509.06175 (2015).

[16] Zheng, G. et al. Metasurface holograms reaching 80% efficiency. Nat. Nanotech. 10, 308-312 (2015).

[17] Kildishev, A. V., Boltasseva, A. & Shalaev, V. M. Planar photonics with metasurfaces. Science 339, 1232009 (2013).

[18] Yu, N. & Capasso, F. Flat optics with designer metasurfaces. Nat. Mater. 13, 139-150 (2014).

[19] Lin, D., Fan, P., Hasman, E. & Brongersma, M. L. Dielectric gradient metasurface optical elements. Science 345, 298-302 (2014).

[20] Arbabi, A., Horie, Y., Bagheri, M. & Faraon, A. Dielectric metasurfaces for complete control of phase and polarization with subwavelength spatial resolution and high transmission. Nat. Nanotech. (2015).

[21] Karimi, E. et al. Generating optical orbital angular momentum at visible wavelengths using a plasmonic metasurface. Light Sci. Appl. 3, e167 (2014).

[22] Fattal, D., Li, J., Peng, Z., Fiorentino, M. & Beausoleil, R. G. Flat dielectric grating reflectors with focusing abilities. Nat. Photon. 4, 466-470 (2010).
[23] Arbabi, A., Horie, Y., Ball, A. J., Bagheri, M. & Faraon, A. Subwavelength-thick lenses with high numerical apertures and large efficiency based on high-contrast transmitarrays. Nat. Commun. 6, 7069 (2015).
[24] Vo, S. et al. Sub-wavelength grating lenses with a twist. IEEE Photon. Technol. Lett. 26, 1375-1378 (2014).
[25] Falco, A. D., Ploschner, M. & Krauss, T. F. Flexible metamaterials at visible wavelengths. New J. Phys. 12, 113006 (2010).
[26] Pryce, I. M., Aydin, K., Kelaita, Y. A., Briggs, R. M. & Atwater, H. A. Highly strained compliant optical metamaterials with large frequency tunability. Nano Lett. 10, 4222-4227 (2010).
[28] Xu, X. et al. Flexible visible-infrared metamaterials and their applications in highly sensitive chemical and biological sensing. Nano Lett. 11, 3232-3238 (2011).
[29] Walia, S. et al. Flexible metasurfaces and metamaterials: A review of materials and fabrication processes at micro- and nano-scales. Appl. Phys. Rev. 2, 011303 (2015).
[30] Zhu, L., Kapraun, J., Ferrara, J. & Chang-Hasnain, C. J. Flexible photonic metastructures for tunable coloration. Optica 2, 255-258 (2015).
[31] Josefsson, L. & Persson, P. Conformal Array Antenna Theory and Design. 29, (John Wiley & Sons, 2006).
[32] He, J., Nuzzo, R. G., Rogers, J. Inorganic materials and assembly techniques for flexible and stretchable electronics. Proc. IEEE 103, 619-632 (2015).
[33] Viventi, J. et al. Flexible, foldable, actively multiplexed, high-density electrode array for mapping brain activity in vivo. Nat. Neurosci. 14, 1599-1605 (2011).
[34] Wang, C. et al. User-interactive electronic skin for instantaneous pressure visualization. Nat. Mater. 12, 899-904 (2013).
[35] Liu, V. & Fan, S. S4: A free electromagnetic solver for layered periodic structures. Comput. Phys. Commun. 183, 2233-2244 (2012).

What is claimed is:

1. A structure comprising:
a lens having a curved surface and configured to operate at a set wavelength;
scattering elements on the curved surface; and
a polymer matrix surrounding the scattering elements at least on one side of each scattering element,
wherein:
the scattering elements are configured to modify an optical property of the lens, and
the scattering elements are made of amorphous silicon and have dimensions smaller than the wavelength at which the lens is configured to operate.

2. The structure of claim 1, wherein the optical property is a focal length of the lens.

3. The structure of claim 1, wherein the optical property is a coma aberration of the lens.

4. The structure of claim 1, wherein the scattering elements are cylindrical posts.

5. The structure of claim 1, wherein physical dimensions of the scattering elements are configured to give a phase profile of optical waves at the curved surface, the phase profile being equal to a difference between a first phase profile at the curved surface and a second phase profile at the curved surface, the second phase profile being a desired phase profile different from the first phase profile.

6. The structure of claim 1, wherein the scattering elements are arranged in a hexagonal lattice.

7. The structure of claim 1, wherein the scattering elements are arranged in a non-random configuration.

* * * * *